United States Patent
Lee

(10) Patent No.: US 9,602,371 B2
(45) Date of Patent: *Mar. 21, 2017

(54) METHODS AND APPARATUS FOR NONINTRUSIVE MONITORING OF WEB BROWSER USAGE

(71) Applicant: The Nielsen Company (US), LLC, Schaumburg, IL (US)

(72) Inventor: Morris Lee, Palm Harbor, FL (US)

(73) Assignee: The Nielsen Comapny (US), LLC, New York, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/330,655

(22) Filed: Jul. 14, 2014

(65) Prior Publication Data

US 2014/0330963 A1 Nov. 6, 2014

Related U.S. Application Data

(60) Continuation of application No. 13/250,623, filed on Sep. 30, 2011, now Pat. No. 8,806,006, which is a
(Continued)

(51) Int. Cl.
*G06F 15/173* (2006.01)
*G06F 15/16* (2006.01)
(Continued)

(52) U.S. Cl.
CPC ............ *H04L 43/08* (2013.01); *G06K 9/2072* (2013.01); *H04N 7/163* (2013.01);
(Continued)

(58) Field of Classification Search
CPC ..... H04L 43/08; H04N 7/163; H04N 21/4782
(Continued)

(56) References Cited

U.S. PATENT DOCUMENTS 6,061,719 A  5/2000 Bendinelli et al.
6,100,941 A  8/2000 Dimitrova et al.
(Continued)

FOREIGN PATENT DOCUMENTS

JP  11154131   6/1999
JP  2002189586  7/2002
(Continued)

OTHER PUBLICATIONS

Pitkow et al., "Identifying Patterns in Network-Based Resource Browser Usage," dated Aug. 3, 1994 (7 pages).
(Continued)

*Primary Examiner* — Minh-Chau Nguyen
(74) *Attorney, Agent, or Firm* — Hanley, Flight & Zimmerman, LLC

(57) ABSTRACT

Example methods disclosed herein for monitoring web browsing include processing a video image obtained from a video signal of a device implementing a web browser to identify a first image region less than the entire video image, the first image region having a first shape corresponding to an address bar of the web browser. Disclosed example methods also include tagging first textual information identified in the first image region as corresponding to an address of a web page displayed by the web browser in response to determining that the first textual information includes a first string of text matching a reference string of text. Disclosed example methods further include reporting the tagged first textual information to determine usage of the web browser.

18 Claims, 11 Drawing Sheets

Related U.S. Application Data division of application No. 12/181,841, filed on Jul. 29, 2008, now Pat. No. 8,090,822.

(60) Provisional application No. 61/044,266, filed on Apr. 11, 2008.

(51) Int. Cl.
| | | |
|---|---|---|
| *H04L 12/26* | (2006.01) | |
| *G06K 9/20* | (2006.01) | |
| *H04N 7/16* | (2011.01) | |
| *H04N 21/44* | (2011.01) | |
| *H04N 21/442* | (2011.01) | |
| *H04N 21/4782* | (2011.01) | |
| *G06F 11/34* | (2006.01) | |

(52) U.S. Cl.
CPC . *H04N 21/44008* (2013.01); *H04N 21/44222* (2013.01); *H04N 21/4782* (2013.01); *G06F 11/3495* (2013.01); *G06K 2209/01* (2013.01)

(58) Field of Classification Search
USPC .......................................... 709/218, 223–224
See application file for complete search history.

(56) References Cited

U.S. PATENT DOCUMENTS

| | | | |
|---|---|---|---|
| 6,108,637 | A | 8/2000 | Blumenau |
| 6,256,620 | B1 | 7/2001 | Jawahar et al. |
| 6,279,036 | B1 | 8/2001 | Himmel et al. |
| 6,397,256 | B1 | 5/2002 | Chan et al. |
| 6,510,461 | B1 | 1/2003 | Nielsen |
| 6,795,856 | B1 | 9/2004 | Bunch |
| 6,839,680 | B1 | 1/2005 | Liu et al. |
| 6,842,782 | B1 | 1/2005 | Malik et al. |
| 6,877,007 | B1 | 4/2005 | Hentzel et al. |
| 6,904,408 | B1 | 6/2005 | McCarthy et al. |
| 6,937,766 | B1 | 8/2005 | Wilf et al. |
| 6,950,938 | B1 | 9/2005 | Fujiwara |
| 6,983,320 | B1 | 1/2006 | Thomas et al. |
| 7,035,926 | B1 | 4/2006 | Cohen et al. |
| 7,058,697 | B2 | 6/2006 | Rhoads |
| 7,103,668 | B1 | 9/2006 | Corley et al. |
| 7,206,820 | B1 | 4/2007 | Rhoads et al. |
| 7,213,254 | B2 | 5/2007 | Koplar et |
| 7,366,996 | B2 | 4/2008 | Hoyle |
| 7,500,183 | B2 | 3/2009 | Kelly |
| 7,689,613 | B2 | 3/2010 | Candelore |
| 7,734,729 | B2 | 6/2010 | Du et al. |
| 7,861,169 | B2 | 12/2010 | Hull et al. |
| 8,019,162 | B2 | 9/2011 | Zhang et al. |
| 8,046,674 | B2 | 10/2011 | Frohlich et al. |
| 8,051,388 | B2 | 11/2011 | Toki |
| 8,090,822 | B2 | 1/2012 | Lee |
| 8,140,058 | B2 | 3/2012 | Park |
| 8,806,006 | B2 | 8/2014 | Lee |
| 2002/0112048 | A1 | 8/2002 | Gruyer et al. |
| 2003/0023742 | A1 | 1/2003 | Allen et al. |
| 2003/0159153 | A1 | 8/2003 | Falvo et al. |
| 2004/0237096 | A1 | 11/2004 | Cain et al. |
| 2006/0085812 | A1 | 4/2006 | Shishegar et al. |
| 2006/0090131 | A1 | 4/2006 | Kumagai |
| 2006/0271365 | A1 | 11/2006 | Maes et al. |
| 2007/0006275 | A1 | 1/2007 | Wright et al. |
| 2007/0079321 | A1 | 4/2007 | Ott, IV |
| 2007/0086669 | A1 | 4/2007 | Berger et al. |
| 2007/0124796 | A1 | 5/2007 | Wittkotter |
| 2007/0276790 | A1 | 11/2007 | Walsh et al. |
| 2008/0098433 | A1 | 4/2008 | Hardacker et al. |
| 2008/0127253 | A1 | 5/2008 | Zhang et al. |
| 2008/0166057 | A1 | 7/2008 | Nakajima |
| 2008/0191035 | A1 | 8/2008 | Cheon |
| 2008/0228776 | A1 | 9/2008 | Weiss et al. |
| 2008/0285940 | A1 | 11/2008 | Kulas |
| 2009/0141934 | A1 | 6/2009 | Caillon et al. |
| 2009/0201532 | A1 | 8/2009 | Pesar |
| 2009/0313670 | A1 | 12/2009 | Takao |
| 2009/0320070 | A1 | 12/2009 | Inoguchi |
| 2010/0218077 | A1 | 8/2010 | Hedbor |

FOREIGN PATENT DOCUMENTS

| | | |
|---|---|---|
| JP | 2010074573 | 4/2010 |
| WO | 9627840 | 9/1996 |
| WO | 03105377 | 12/2003 |
| WO | 2005065159 | 7/2005 |
| WO | 2005079501 | 9/2005 |
| WO | 2006002706 | 1/2006 |

OTHER PUBLICATIONS

United States Patent and Trademark Office "Notice of Allowance," issued in connection with U.S. Appl. No. 12/181,841, mailed on Jul. 8, 2011 (14 pages).

United States Patent and Trademark Office, "Office Action," issued in connection with U.S. Appl. No. 12/181,841, mailed on Mar. 17, 2011 (26 pages).

United States Patent and Trademark Office, "Office Action," issued in connection with U.S. Appl. No. 12/181,841, mailed on Jun. 28, 2010 (69 pages).

United States Patent and Trademark Office, "Non-Final Office Action", issued in connection with U.S. Appl. No. 13/250,623, dated Dec. 23, 2011 (11 pages).

United States Patent and Trademark Office, "Final Office Action", issued in connection with U.S. Appl. No. 13/250,623, dated Sep. 12, 2012 (15 pages).

United States Patent and Trademark Office, "Non-Final Office Action", issued in connection with U.S. Appl. No. 13/250,623, dated Nov. 6, 2013 (8 pages).

United States Patent and Trademark Office, "Notice of Allowance", issued in connection with U.S. Appl. No. 13/250,623, dated Apr. 1, 2014 (8 pages).

METHODS AND APPARATUS FOR NONINTRUSIVE MONITORING OF WEB BROWSER USAGE

RELATED APPLICATION

This patent arises from a continuation of U.S. patent application Ser. No. 13/250,623 (now U.S. Pat. No. 8,806, 006), entitled "Methods and Apparatus for Nonintrusive Monitoring of Web Browser Usage," and filed on Sep. 30, 2011, which is a divisional of U.S. patent application Ser. No. 12/181,841 (now U.S. Pat. No. 8,090,822), entitled "Methods and Apparatus for Nonintrusive Monitoring of Web Browser Usage," and filed on Jul. 29, 2008, which claims the benefit of and priority to U.S. Provisional Application Ser. No. 61/044,266, entitled "Methods and Apparatus for Nonintrusive Monitoring of Web Browser Usage," and filed on Apr. 11, 2008. U.S. patent application Ser. No. 13/250,623, U.S. patent application Ser. No. 12/181,841 and U.S. Provisional Application Ser. No. 61/044,266 are hereby incorporated by reference in their respective entireties.

FIELD OF THE DISCLOSURE

This disclosure relates generally to audience measurement and, more particularly, to methods and apparatus for nonintrusive monitoring of web browser usage.

BACKGROUND

The web browser is rapidly becoming an important venue for reaching and interacting with consumers. For example, electronic commerce, or ecommerce, has become a significant, if not primary, revenue source for many retailers of products and services. Web sites and online content providers are now competing with traditional broadcast and cable networks to deliver media content to audiences across all demographics. Increasingly, advertisers are paying to embed advertisements in commonly-accessed web sites. Through web browser usage monitoring, insight into the habits and preferences of online consumers can be gained. Armed with this insight, retailers, content providers, advertisers, etc., can adapt their online presence to improve their reach and interaction with consumers.

Many conventional web browser monitoring techniques require one or more software applications to be installed and executed on the computer (or, more generally, computing device) implementing the monitored web browser. Additionally, these resident software applications may require access to the network infrastructure providing network connectivity for the monitored computer to report monitored data to a central data collection facility. However, many businesses and commercial enterprises, and even some individuals, are reluctant to have such third-party applications installed and executed on their computers. This reluctance can stem from specific concerns regarding increased risks of viruses or incompatibilities with existing software configurations, to more general concerns about the increased amount of person-hours needed to support the additional software application(s) running on the enterprise's computer network(s).

DETAILED DESCRIPTION

Figure 1:
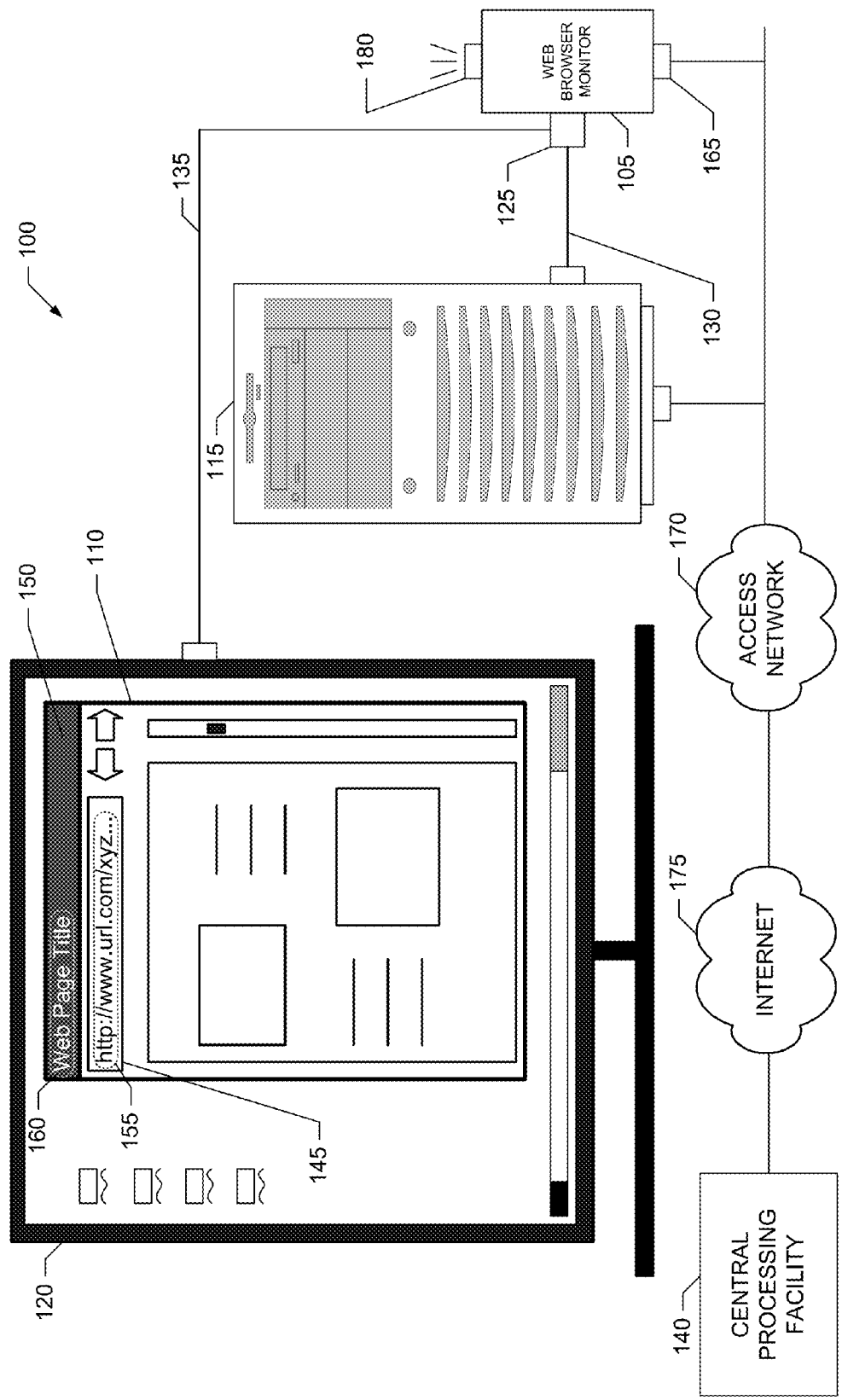
FIG. 1 is a block diagram of a first example system utilizing a first example web browser monitor configuration to perform nonintrusive monitoring of web browser usage.
Figure 2:
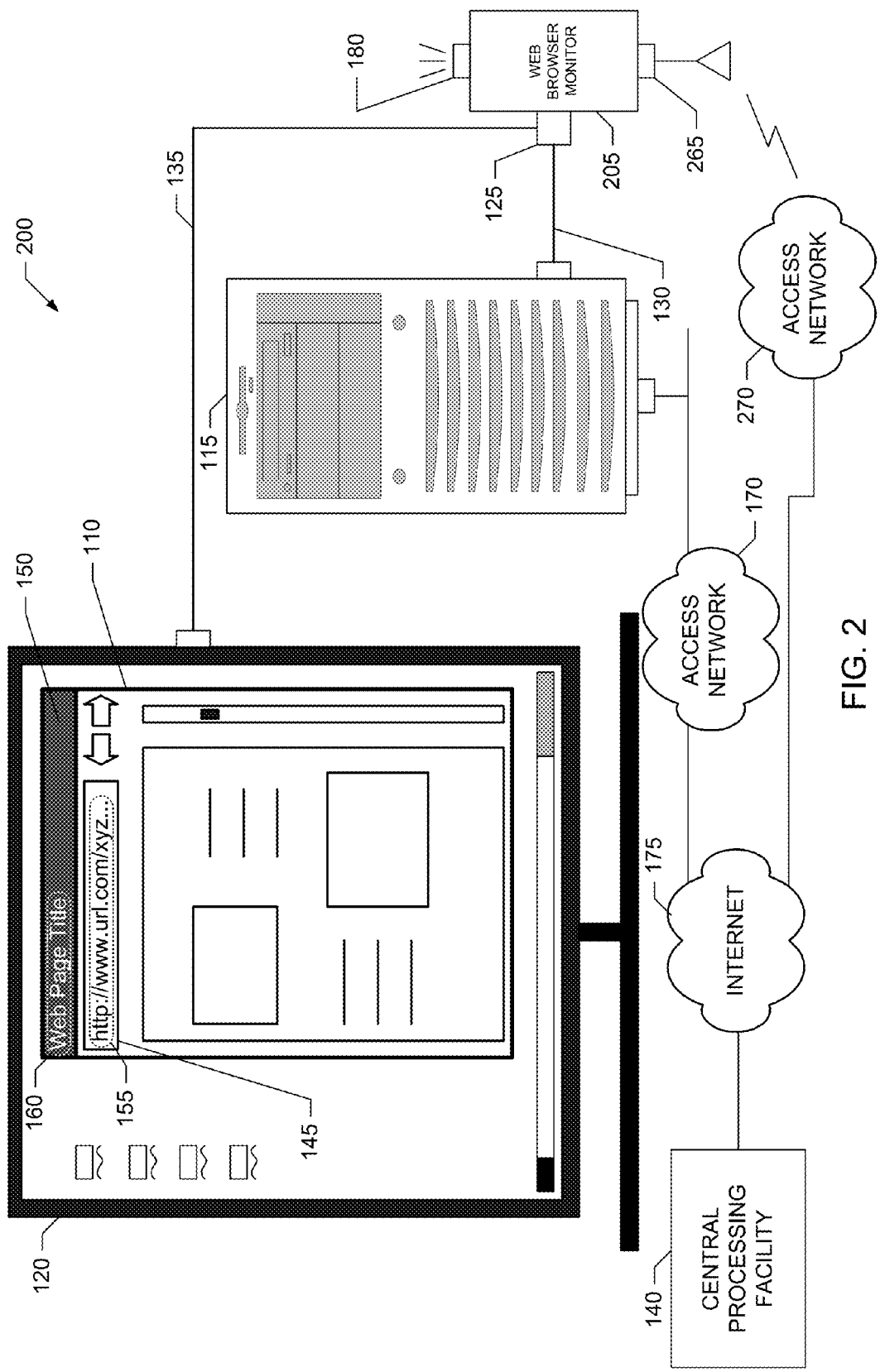
FIG. 2 is a block diagram of a second example system utilizing a second example web browser monitor configuration to perform nonintrusive monitoring of web browser usage.
Figure 3:
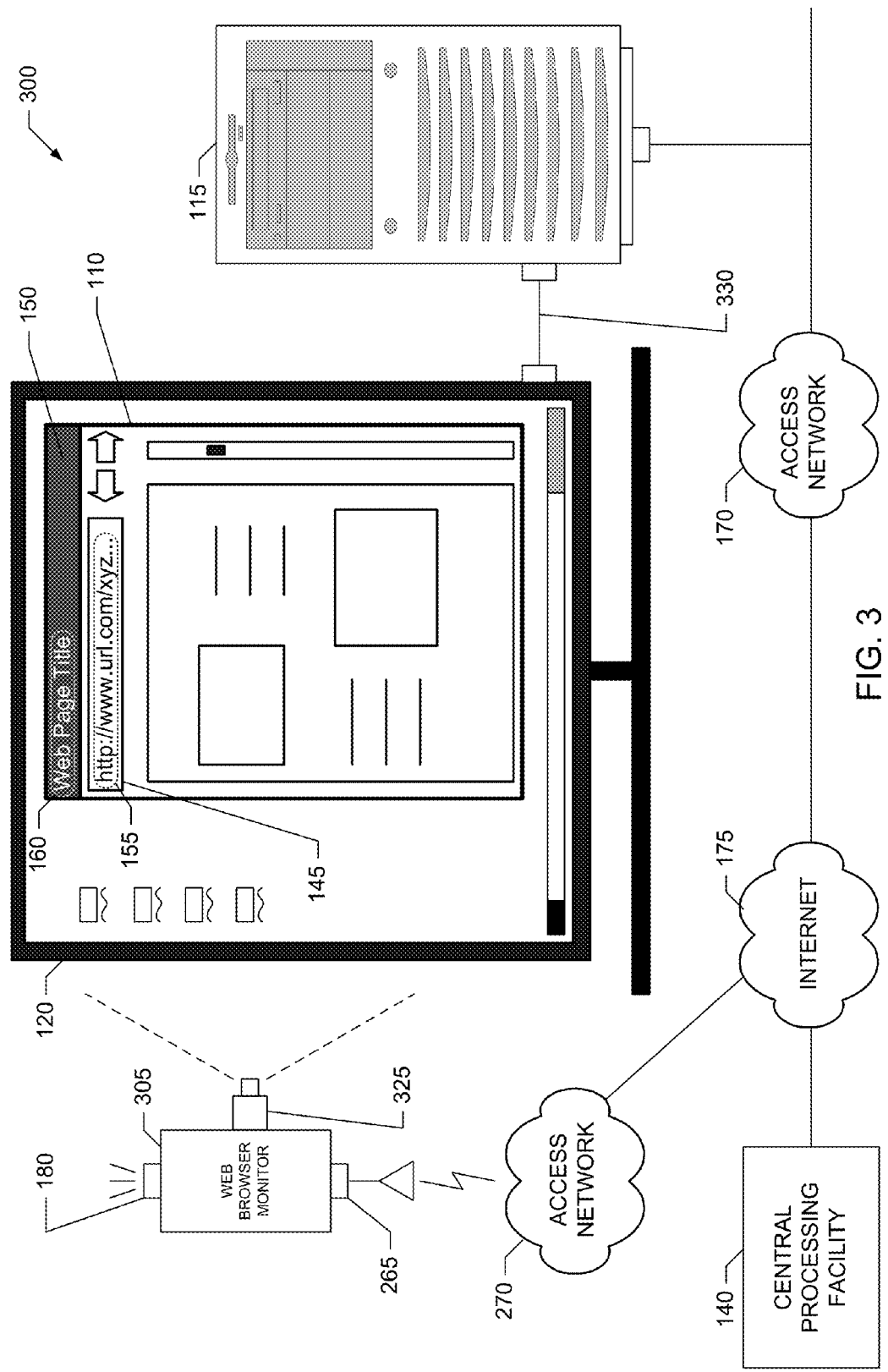
FIG. 3 is a block diagram of a third example system utilizing a third example web browser monitor configuration to perform nonintrusive monitoring of web browser usage.

As discussed above, many businesses and commercial enterprises, and even some individuals, are reluctant to have conventional web browser monitoring applications installed and executed on their computers over concerns regarding, for example, increased risks of viruses, incompatibilities with existing software configurations, additional burdens on computer support staff, etc. FIGS. 1-3 illustrate example systems that implement nonintrusive techniques for web browser monitoring according to the methods and/or apparatus described herein that may alleviate some, if not all, of these concerns. Accordingly, at least under some circumstances, the example systems of FIGS. 1-3 can increase the number and breadth of locations/computers able to be monitored.

Although nonintrusive techniques are available for monitoring exposure to television broadcasts and other media content, many such techniques are not conducive to monitoring web browser usage. For example, some existing techniques perform nonintrusive monitoring of television broadcasts by capturing and processing images corresponding to a television display. Some of these techniques rely on predetermined and/or stationary regions of the display to determine where to look for channel and/or program identification information. However, in a typical computing environment, the web browser may be positioned and/or sized to fit anywhere within the computer display. Because the display region(s) containing the web browser are not predetermined, many television techniques relying on predetermined regions containing channel and/or program identification information are not suited to web browser monitoring. Additionally, much of a computer's display is stationary (or semi-stationary with moving video played in only a portion of the overall display), as compared to a television whose entire display area includes moving video except where stationary channel and/or program identification information is displayed. Thus, existing television monitoring techniques relying on stationary regions to locate channel and/or program identification information are not suited for web browser monitoring because they cannot readily distinguish between the stationary (or semi-stationary) window(s)/region(s) corresponding to a web browser and the stationary (or semi-stationary) window(s)/region(s) corresponding to other executing applications (e.g., such as an open email application, word processing application, etc.), or even the general background and desktop icons, menu bars, etc., presented by a typical computer display.

Turning to the figures, a first example system 100 supporting nonintrusive monitoring of web browser usage according to the methods and/or apparatus described herein is illustrated in FIG. 1. The example system 100 includes a first example web browser monitor 105 arranged in a first example configuration for monitoring a web browser 110. The web browser monitor 105 is able to monitor usage of any type of web browser 110, such as, for example, Microsoft's Internet Explorer® browser, Mozilla's Firefox® browser, Apple's Safari® browser, Opera Software's Opera® browser, any type of wireless application protocol (WAP) browser for operation on a mobile device, etc.

In the illustrated example, the web browser 110 is implemented by a computer 115 and displayed via a monitor 120. However, any type of computing device (e.g., such as the computer 115 of the illustrated example) and display device (e.g., such as the monitor 120 of the illustrated example) could be used to implement and display any type of web browser to be monitored by the web browser monitor 105. For example, the computing device 115 could alternatively be implemented by a cable and/or satellite set-top box, a dedicated Internet appliance, a game console, etc., and/or the display device 120 could alternatively be implemented by any type of television. Furthermore, in some example implementations, the computing device 115 and the display device 120 are integrated into a single consumer device. For example, the computing device 115 and the display device 120 could alternatively be integrated into a laptop/notebook computer, a personal digital assistant (PDA), a mobile telephone (e.g., such as a smartphone), etc.

In the example system 100 illustrated in FIG. 1, the example web browser monitor 105 monitors the web browser 110 nonintrusively (e.g., without requiring software to be installed and/or executed on the monitored device) by accessing a video cable connection coupling the computer 115 with the monitor 120. To access the video cable connection, the example web browser monitor 105 includes a video interface 125 that implements a video splitter to split a video signal output by the computer 115 and carried via a first video cable connection 130. The video splitter implemented by the video interface 125 routes the video signal output by the computer 115 to the monitor 120 via a second video cable connection 135. Additionally, the video splitter implemented by the video interface 125 accepts the video signal output by the computer 115 for input to the example web browser monitor 105. In an alternative example implementation involving an integrated computer 115 and monitor 120 (e.g., such as a laptop/notebook computer, a PDA, a mobile telephone (e.g., such as a smartphone), etc.), the video splitter implemented by the video interface 125 can accept a video signal output by the integrated computing device (e.g., via a video port allowing connection of the integrated device to an external display device) for input to the example web browser monitor 105, with the second cable connection 135 being unused.

The example web browser monitor 105 included in the example system 100 processes the video signal output by the computer 115 and received via the video interface 125 to monitor the web browser 110 without requiring any software applications to be installed and executed on the computer 115. Instead, the example web browser monitor 105 captures video images from the video signal received via the video interface 125. The example web browser monitor 105 then performs graphical recognition processing on some or all of the captured video images to identify region(s) of the captured video image(s) consistent with a display of the web browser 110 or specific portions of the web browser 110. Upon identifying one or more regions of a captured video image consistent with the display of the web browser 110, the example web browser monitor 105 extracts the identified region(s) from the captured video image. The web browser monitor 105 then performs textual recognition processing on the extracted region(s) to determine any textual information displayed in the extracted region(s). The textual information is processed to determine whether it corresponds to textual information displayed by the web browser 110 and, if so, the web browser monitor 105 stores and reports the textual information to a central processing facility 140.

For example, after capturing a video image from the video signal received via the video interface 125, the web browser monitor 105 of the illustrated example performs graphical recognition processing on the captured video image to identify region(s) of interest consistent with the display of the web browser 110. In the illustrated example, the graphical recognition processing includes a feature extraction process. The feature extraction performed by the example web browser 105 includes, for example, edge detection, corner detection and/or blob detection techniques tailored to identify and extract rectangular regions corresponding to, for example, an address bar 145 and/or a title bar 150 of the web browser 110. In a typical web browser implementation, the address bar 145 is configured to display an address 155 of a web page being presented by the web browser 110. The address 155 may be, for example, a uniform resource locator (URL) or a numeric Internet protocol (IP) address for the presented web page. A typical web browser implementation also includes the title bar 150 to display a title 160 for the web page being presented by the web browser 110.

After identifying and extracting region(s) corresponding to the address bar 145 and/or title bar 150 (or portions thereof) in the captured video image, the web browser monitor 105 of the illustrated example stores the extracted region(s) as images for subsequent textual recognition processing. Additionally, the web browser monitor 105 may store location information (e.g., such as X-Y coordinates) corresponding to the position of each extracted region(s) within the captured video image. In an example implementation, the web browser monitor 105 is configured to perform textual recognition processing (e.g., pattern recognition), such as optical character recognition (OCR), on the extracted image region(s) to identify one or more text strings consistent with an address of a web page presented by the web browser 110. For example, the web browser monitor 105 of the illustrated example operates on character strings identified via OCR processing to search for a text string matching a known format of a URL or a numeric IP address for a web page.

Upon identifying a text string matching a known URL or numeric IP address format, the web browser monitor 105 extracts the matching text and tags the text as corresponding to the address 155 of a web page being displayed by the web browser 110. Additionally, the example web browser monitor 105 tags the extracted image region containing the matching text as corresponding to the address bar 145 of the web browser 110. If there are other extracted region(s) available to process, the web browser monitor 105 of the illustrated example also performs pattern recognition, such as OCR, on the other extracted image region(s) to identify and extract, for example, the title 160 displayed in the title bar 150 of the web browser 110. For example, after processing and tagging an extracted region corresponding to the address bar 145, the example web browser monitor 105 may select and perform OCR processing on another available extracted region positioned above the address bar 145 to determine whether the region corresponds to the title bar 150. If textual information is found in the selected region, the example web browser monitor 105 extracts and tags the text as corresponding to the title 160 of the web page being displayed by the web browser 110. Additionally, the example web browser monitor 105 tags the selected image region as corresponding to the title bar 150 of the web browser 110. The example web browser monitor 105 may then continue processing available extracted regions to support situations in which more than one web browser 110 is currently being displayed via the monitor 120.

After processing all the available extracted region(s) in the captured video image, the example web browser monitor 105 stores any extracted and tagged text corresponding to the address 155 and/or title 160 for reporting to the central processing facility 140. For example, the web browser monitor 105 may be configured to store and report this monitored web browser address and/or title information at predetermined time intervals and/or upon occurrence of particular events (e.g., such as a prompt from the central processing facility 140 to the web browser monitor 105 to report any available web browser monitoring data). To report the monitored web browser address and/or title information, the example web browser monitor 105 includes a network interface 165. In the illustrated example, the network interface 165 of the example web browser monitor 105 is configured to interface with the same access network 170 providing network connectivity for the computer 115. The access network 170 may be implemented by any type of access network, such as, for example, a company/enterprise local area network (LAN), a broadband cable network, a broadband satellite network, broadband mobile cellular network, an Internet service provider (ISP), a dial-up connection, etc. In the illustrated example, the access network 170 provides access to the Internet 175 or any other wide area network to allow the example web browser monitor 105 to report the monitored web browser address and/or title information to the central processing facility 140 using any appropriate data communication protocol.

In the illustrated example, the central processing facility 140 is configured to receive web browser monitoring data, such as, for example, monitored web browser address and/or title information, from one or more web browser monitors, such as the example web browser monitor 105 as shown. The central processing facility 140 processes the received web browser monitoring data to determine, for example, the web site(s) accessed and/or web page(s) presented by the monitored web browser(s). In an example implementation, the central processing facility 140 uses received web browser address information in the form of, for example, URLs and/or numeric IP addresses to determine the web site(s) accessed by the monitored web browser(s). If the returned web browser address information is complete (e.g., was displayed fully within a particular monitored web browser's address bar), the central processing facility 140 may use the address information to determine the particular web page(s) presented by the monitored web browser(s) in addition or as an alternative to determining the web site(s) accessed by the monitored web browser(s). However, if the web browser address information is incomplete (e.g., not displayed fully within the monitored web browser's address bar), the central processing facility 140 may use the received title information, alone or in combination with any available, but incomplete, address information, to further identify the web page(s) presented by the monitored web browser(s).

To provide an indication that the web browser monitor 105 has been configured properly, the web browser monitor 105 of the illustrated example includes a video interface activity indicator 180. The video interface activity indicator 180 is asserted/activated when a valid video signal is detected at the video interface 125. Thus, the video interface activity indicator 180 indicates whether the web browser monitor 105 has been configured correctly and is receiving the video signal being output by the computer 115 and carried via the first video connection 130. Although depicted as a light in the illustrated example, the video interface activity indicator 180 may be implemented using any type or combination of indicator devices, such as one or more light(s), light emitting diode(s), liquid crystal display(s), sound emitter(s), speaker(s), etc., or any combination thereof which, when asserted/activated, indicate that the web browser monitor 105 is receiving a valid video signal at the video interface 125.

A block diagram of a second example system 200 supporting nonintrusive monitoring of web browser usage according to the methods and/or apparatus described herein is illustrated in FIG. 2. The example system 200 includes a second example web browser monitor 205 arranged in a second example configuration for monitoring the web browser 110. The second example system 200 includes many elements in common with the first example system 100 of FIG. 1. As such, like elements in FIGS. 1 and 2 are labeled with the same reference numerals. These like elements include, for example, the web browser 110, the computer 115, the monitor 120, the video interface 125, the first video cable connection 130, the second video cable connection 135, the central processing facility 140, the address bar 145, the title bar 150, the address 155, the title 160, the access network 170, the Internet 175 and the video interface activity indicator 180. The detailed descriptions of these like elements are provided above in connection with the discussion of FIG. 1 and, in the interest of brevity, are not repeated in the discussion of FIG. 2.

Turning to FIG. 2, the second example web browser monitor 205 is configured to nonintrusively monitor the web browser 110 in a manner similar to the first example web browser monitor 105 of FIG. 1. For example, like the first example web browser monitor 105 of FIG. 1, the second example web browser monitor 205 of FIG. 2 is configured to: (i) capture video image(s) from the video signal received via the video interface 125, (ii) perform graphical recognition processing on at least some of the captured video image(s) to identify and extract one or more regions of the processed video image(s) consistent with a display of the web browser 110 or specific portions of the web browser 110, (iii) perform textual recognition processing on the extracted region(s) to identify and extract textual information displayed by the web browser 110 and (iv) store and report the textual information to the central processing facility 140.

However, unlike the first example web browser monitor 105, the second example web browser monitor 205 includes a network interface 265 configured to interface with a second access network 270 different from the first access network 170 providing network connectivity for the computer 115. By interfacing with the second access network 270 instead of the first access network 170 to report web browser monitoring data via the Internet 170 to the central processing facility 140, the second example web browser monitor 205 can operate even more autonomously, at least in some environments, than the first example web browser monitor 105. The second access network 270 may be implemented by, for example, a broadband mobile cellular network as depicted in the illustrated example, or any other type of broadband network, ISP, LAN, dial-up connection, etc.

A block diagram of a third example system 300 supporting nonintrusive monitoring of web browser usage according to the methods and/or apparatus described herein is illustrated in FIG. 3. The example system 300 includes a third example web browser monitor 305 arranged in a third example configuration for monitoring the web browser 110. The third example system 300 includes many elements in common with the first example system 100 and the second example system 200 of FIGS. 1 and 2, respectively. As such, like elements in FIGS. 1, 2 and 3 are labeled with the same reference numerals. These like elements include, for example, the web browser 110, the computer 115, the monitor 120, the central processing facility 140, the address bar 145, the title bar 150, the address 155, the title 160, the first access network 170, the Internet 175, the video interface activity indicator 180, the network interface 265 and the second access network 270. The detailed descriptions of these like elements are provided above in connection with the discussions of FIGS. 1-2 and, in the interest of brevity, are not repeated in the discussion of FIG. 3.

Turning to FIG. 3, the third example web browser monitor 305 is configured to nonintrusively monitor the web browser 110 in a manner similar to the first example web browser monitor 105 of FIG. 1. For example, like the first example web browser monitor 105 of FIG. 1, the third example web browser monitor 305 of FIG. 3 is configured to: (i) capture one or more video image(s) corresponding to a video signal output by the computer 115, (ii) perform graphical recognition processing on at least some of the captured video image(s) to identify and extract one or more regions of the processed video image(s) corresponding to a display of the web browser 110 or specific portions of the web browser 110, (iii) perform textual recognition processing on the extracted region(s) to identify and extract textual information displayed by the web browser 110 and (iv) store and report the textual information to the central processing facility 140. Additionally, like the second example web browser monitor 205 of FIG. 2, the third example web browser monitor 305 of FIG. 3 includes the network interface 265 to interface with the second access network 270, which is different from the first access network 170 providing network connectivity for the computer 115.

However, unlike the first example web browser monitor 105 or the second example web browser monitor 205, the third example web browser monitor 305 includes a video interface 325 implementing an image sensor, a camera or similar optical device positioned to capture real-time images of the monitor 120 without requiring a physical connection to either the monitor 120 or computer 115. As such, in the example system 300, the video signal output by the computer 115 can be directly coupled to the monitor 120 via a cable connection 330. In other words, the typical configuration of the computer 115 monitor 120, and the first access network 170, is unchanged by the introduction of the third example web browser monitor 305. By using the image sensor-based video interface 325 rather than the cable-based (e.g., wired) video interface 125 to capture video images corresponding to the video signal output by the computer 115, and by interfacing with the second access network 270 instead of the first access network 170 to report web browser monitoring data via the Internet 170 to the central processing facility 140, the third example web browser monitor 305 can operate autonomously and nonintrusively to collect web access data.

Although three different web browser monitor configurations have been illustrated in the examples of FIGS. 1, 2 and 3, web browser monitoring according to the methods and apparatus described herein is not limited thereto. Other equivalent configurations are contemplated by the web browser monitoring methods and apparatus described herein.

Figure 4A:
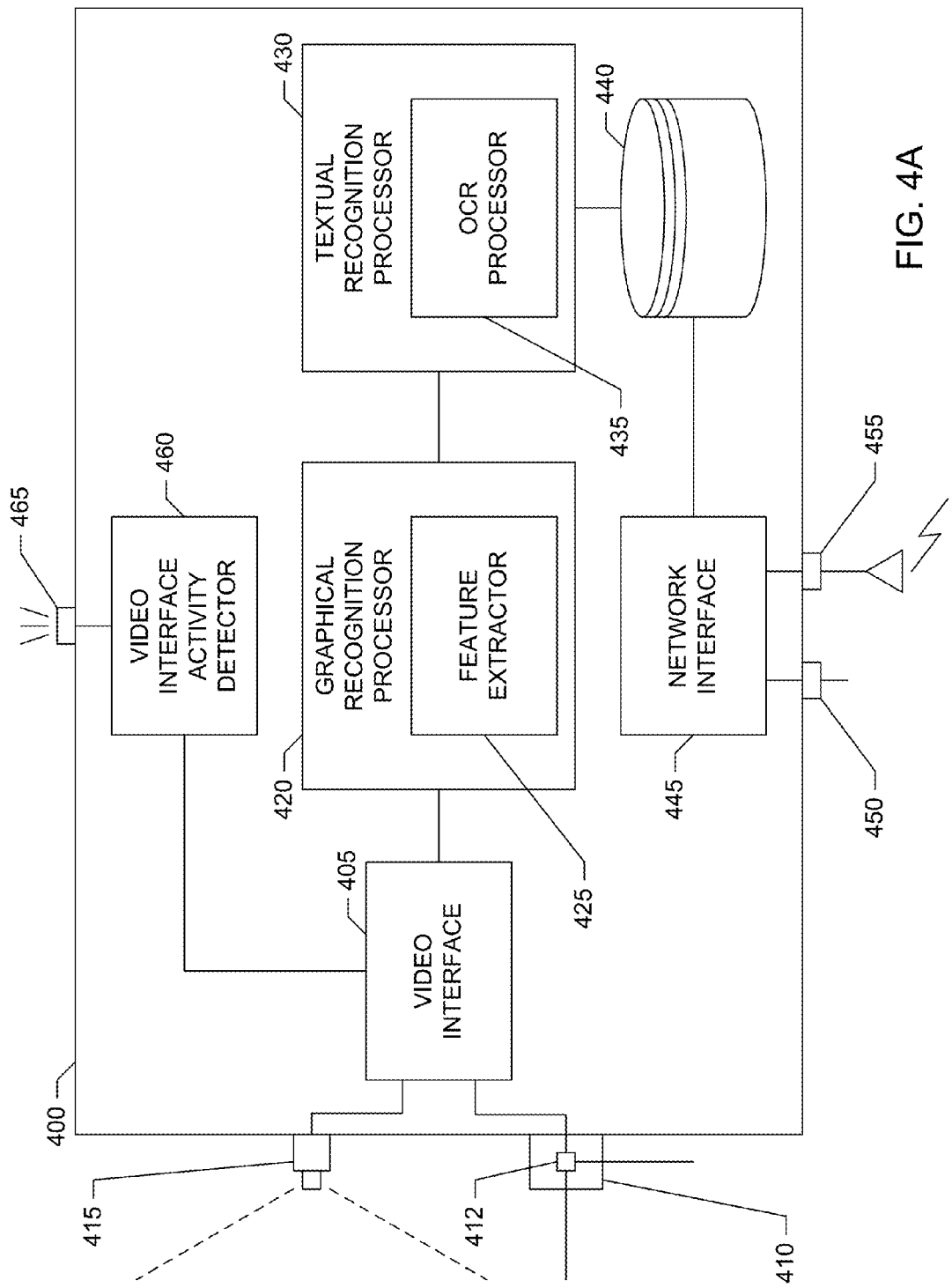
FIG. 4A is a block diagram of an example web browser monitor including an example graphical recognition processor and an example textual recognition processor that may be used to implement the respective first, second and/or third example web browser monitor configurations of FIGS. 1, 2 and/or 3.

A block diagram of an example web browser monitor 400 implemented according to the methods and apparatus described herein, and that may be used to implement the first example web browser monitor 105 of FIG. 1, the second example web browser monitor 205 of FIG. 2 and/or the third example web browser monitor 305 of FIG. 3, is illustrated in FIG. 4A. The example web browser monitor 400 illustrated in FIG. 4A includes a video interface 405 to accept a video signal corresponding to a device (e.g., such as the computer 115 and/or the monitor 120) implementing a web browser to be monitored (e.g., such as the web browser 110). Additionally, the example video interface 405 is configured to capture video images from the received video signal for subsequent processing by the example web browser monitor 400.

To accept the video signal corresponding to the device implementing the monitored web browser (referred to herein as the "monitored device"), the example video interface 405 includes a video connector 410 configured to electrically couple with a video output of the monitored device. For example, the video connector 410 may be implemented to interface with a video graphics array (VGA) cable coupled with the monitored device, an S-video cable coupled with the monitored device, a composite video cable coupled with the monitored device, etc. The video connector 410 of the illustrated example also implements a video splitter 412 to allow the applied video signal to still be routed to the appropriate display device (e.g., such as the monitor 120).

Additionally or alternatively, the example video interface 405 includes an image sensor 415 configured to be positionable to capture video images corresponding to a video display produced by the monitored device (e.g., such as a video display of the monitor 120 produced by the computer 115). For example, the image sensor 415 may be implemented by any type of camera or optical sensor, such as a web cam, mobile phone camera, etc.

To process video images captured by the video interface 405, the example web browser monitor 400 includes a graphical recognition processor 420. The example graphical recognition processor 420 is configured to identify and extract one or more region(s) of a captured video image corresponding to at least a portion of a monitored web browser. For example, the graphical recognition processor 420 of the illustrated example is configured to identify and extract region(s) of the captured video image displaying at least a portion of an address bar (e.g., such as the address bar 145) and/or at least a portion of a title bar (e.g., such as the title bar 150) of the monitored web browser. To perform such region identification and extraction, the graphical recognition processor 420 implements a feature extractor 425. The feature extractor 425 of the illustrated example implements any appropriate graphical recognition operation, such as edge detection, corner detection, blob detection, etc., or any combination thereof, to identify one or more rectangular regions corresponding to the displayed address bar and/or title bar of the monitored web browser.

Upon identifying one or more such rectangular regions, the feature extractor 425 of the illustrated example extracts the identified region(s) from the captured video image, tags the location(s) of the extracted region(s), and provides the extracted image region(s) and tagged location(s) to a textual recognition processor 430. The example textual recognition processor 430 is configured to identify and extract textual information displayed in the extracted image region(s) provided by the example graphical recognition processor 420. For example, the textual recognition processor 430 of the illustrated example operates on input image region(s) to identify and extract text corresponding to address information displayed in an address bar of the monitored web browser, title information displayed in a title bar of the monitored web browser, etc. To identify and extract such textual information, the textual recognition processor 430 implements an OCR processor 435. The OCR processor 435 of the illustrated example implements any appropriate OCR technique for determining textual information included in an image.

When the OCR processor 435 determines that textual information is included in an input image region, the example textual recognition processor 430 extracts the text and determines whether it corresponds to an address displayed in the address bar of the monitored web browser. In the illustrated example, to determine whether the extracted text corresponds to an address displayed in the monitored web browser's address bar, the textual recognition processor 430 determines whether the extracted text matches a known format of a URL or a numeric IP address for a web page. For example, the textual recognition processor 430 may search the extracted text for one or more strings matching possible URL schemes, such as: (1) the string "http://", (2) the string "https://", (3) the string "ftp://", (4) the string "news://", etc. Additionally or alternatively, the textual recognition processor 430 may search the extracted text for one or more strings indicative of a start of a URL (e.g., such as the strings "www.", "ftp.", etc.), one or more strings indicative of an end of a URL (e.g., such as the strings ".com", ".edu", ".gov", ".org", etc., and/or any other possible domain suffixes), and/or one or more sequences of two or three strings of text separated by periods (e.g., such as "www.xzy.com" or "xyz.com"). Furthermore, the textual recognition processor 430 may search the extracted text for strings indicative of a numeric IP address of the form "###.###.###.###" (e.g., such as "123.45.67.8") in which each group of pounds signs ("###") represents a number ranging from 0 to 255.

The example textual recognition processor 430 may also be configured to search for certain combinations of the strings mentioned above to further determine whether the extracted text matches a format of a URL. For example, the textual recognition processor 430 may be configured to search for combinations of the above-mentioned strings corresponding to a complete URL of a web server, such as string combinations of the form "http://www.xyz.com", "https://xyz.com" and the like. In at least some example implementations, the textual recognition processor 430 may also be configured to search for combinations of strings corresponding to only a partial URL of a web server or a URL of a local web server, such as string combinations of the form "http://xyz" and the like. Broadly speaking, the example textual recognition processor 430 may be configured to use any available information from known standards and/or common practices to search for text strings and/or combinations of text strings indicative of URLs.

When text matching the known address format of a web page is found in an input image region, the example textual recognition processor 430 tags the matching text as corresponding to the address (e.g., such as the address 155) displayed in the address bar (e.g., such as the address bar 145) of the monitored web browser. Additionally, the example textual recognition processor 430 may tag the input image region as corresponding to the address bar of the monitored web browser. Furthermore, if there are additional image region(s) to process, the example textual recognition processor 430 may determine any textual information included in these image regions using the OCR processor 435. Based on the positioning of the additional image region(s) (e.g., such as if an additional image region is located above the previously determined and tagged address bar image region), the example textual recognition processor 430 may extract and tag the determined textual information as corresponding to the title (e.g., such as the title 160) of a web page being presented by the monitored web browser. Additionally, the example textual recognition processor 430 may also tag the corresponding image region as corresponding to the title bar (e.g., such as the title bar 150) of the monitored web browser.

Upon identifying, extracting and tagging textual information included in the input image region(s) as corresponding to the monitored web browser (e.g., such as address and/or title information), the example textual recognition processor 430 stores the resulting textual information (referred to herein as "web browser monitoring data" or "web browser monitoring information") in a storage unit 440 included in the example web browser monitor 400. The storage unit 440 may be implemented by any type of storage device, memory, etc. The example web browser monitor 400 further includes a network interface 445 configured to interface with one or more access networks to enable the web browser monitoring data stored in the storage unit 440 to be reported to the central processing facility 140.

To interface with one or more access networks, the example network interface 445 includes a network cable connector 450. The network cable connector 445 physically couples the network interface 445 with an access network, such as, for example, a LAN, a broadband cable network, a broadband satellite network, a dial-up connection, etc. As such, the network cable connector 450 may be implemented to interface with, for example, an RJ-45 Ethernet cable, a broadband coaxial cable, an optical fiber cable, etc. Additionally or alternatively, the example network interface 445 includes a wireless network interface 455 configured to access a wireless access network, such as, for example, a broadband mobile cellular network, a wireless LAN, etc.

The web browser monitor 400 of the illustrated example also includes a video interface activity detector 460 coupled to a video interface activity indicator 465. The example video interface activity detector 460 is configured to process the video signal received by the example video interface 405 to detect whether a valid video signal has been applied to or received by the example web browser monitor 400. For example, the example video interface activity detector 460 may examine an electrical voltage applied to the video interface 405 to detect a valid video signal. Additionally or alternatively, the example video interface activity detector 460 may determine whether a video signal flicker associated with the refresh rate of a display device is present to detect a valid video signal.

Upon detecting a valid video signal, the example video interface activity detector 460 asserts/activates the example video interface activity indicator 465. The example video interface activity indicator 465 can be used during installation and debug to indicate whether the example web browser monitor 400 has been configured properly and is receiving a valid video signal. As discussed above, the example video interface activity indicator 465 may be implemented using any type or combination of indicator device(s), such as one or more light(s), light emitting diode(s), liquid crystal display(s), sound emitter(s), speaker(s), etc., or any combination thereof.

While an example manner of implementing the first example web browser monitor 105 of FIG. 1, the second example web browser monitor 205 of FIG. 2 and/or the third example web browser monitor 305 of FIG. 3 has been illustrated in FIG. 4A, one or more of the elements, processes and/or devices illustrated in FIG. 4A may be combined, divided, re-arranged, omitted, eliminated and/or implemented in any other way. Further, the example video interface 405, the example graphical recognition processor 420, the example feature extractor 425, the example textual recognition processor 430, the example OCR processor 435, the example network interface 445, the example video interface activity detector 460 and/or, more generally, the example web browser monitor 400 of FIG. 4A may be implemented by hardware, software, firmware and/or any combination of hardware, software and/or firmware. Thus, for example, any of the example video interface 405, the example graphical recognition processor 420, the example feature extractor 425, the example textual recognition processor 430, the example OCR processor 435, the example network interface 445, the example video interface activity detector 460 and/or, more generally, the example web browser monitor 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example web browser monitor 400, the example video interface 405, the example graphical recognition processor 420, the example feature extractor 425, the example textual recognition processor 430, the example OCR processor 435, the example network interface 445 and/or the example video interface activity detector 460 are hereby expressly defined to include a tangible medium such as a memory, digital versatile disk (DVD), compact disk (CD,) etc., storing such software and/or firmware. Further still, the example web browser monitor 400 of FIG. 4A may include one or more elements, processes and/or devices in addition to, or instead of, those illustrated in FIG. 4A, and/or may include more than one of any or all of the illustrated elements, processes and devices.

Figure 4B:
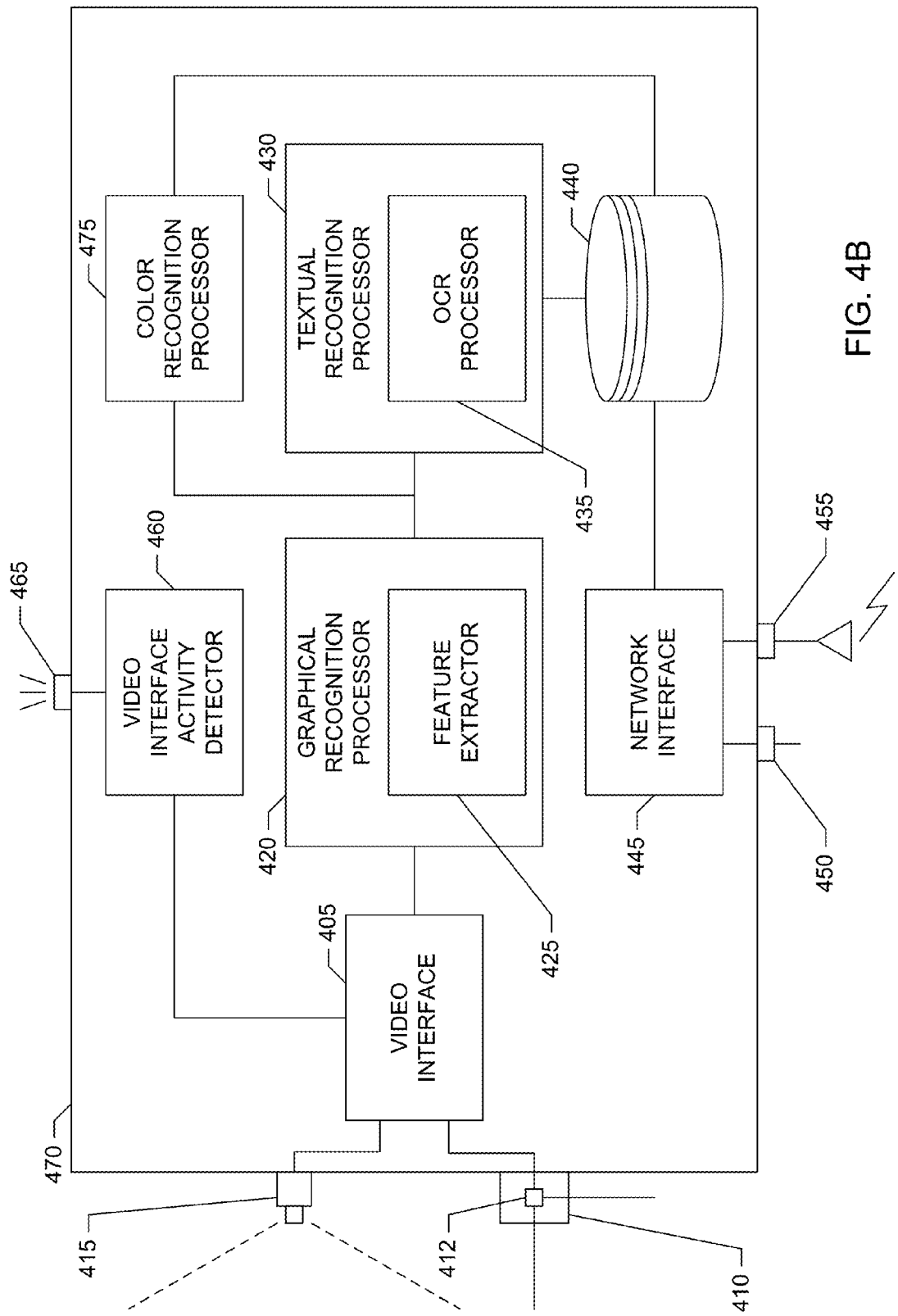
FIG. 4B is a block diagram of an example web browser monitor including an example color recognition processor in addition to the example graphical recognition processor and the example textual recognition processor that may be used to implement the respective first, second and/or third example web browser monitor configurations of FIGS. 1, 2 and/or 3.

A block diagram of another example web browser monitor 470 implemented according to the methods and apparatus described herein, and that may be used to implement the first example web browser monitor 105 of FIG. 1, the second example web browser monitor 205 of FIG. 2 and/or the third example web browser monitor 305 of FIG. 3, is illustrated in FIG. 4B. The example web browser monitor 470 of FIG. 4B includes many elements in common with the example web browser monitor 400 of FIG. 4A. As such, like elements in FIGS. 4A and 4B are labeled with the same reference numerals. The detailed descriptions of these like elements are provided above in connection with the discussion of FIG. 4A and, in the interest of brevity, are not repeated in the discussion of FIG. 4B.

Turning to FIG. 4B, the example web browser monitor 470 includes a color recognition processor 475 in addition to the example video interface 405, the example video connector 410, the example video splitter 412, the example image sensor 415, the example graphical recognition processor 420, the example feature extractor 425, the example textual recognition processor 430, the example OCR processor 435, the example storage unit 440 the example network interface 445, the example network cable connector 450, the example wireless network interface 455, the example video interface activity detector 460 and the example video interface activity indicator 465 included in the example web browser monitor 400 of FIG. 4A. In the illustrated example, the color recognition processor 475 is configured to extract color information from the video image region(s) extracted by the example graphical recognition processor 420. The example color recognition processor 475 then uses the extracted color information to determine color scheme(s) associated with the video image region(s) undergoing processing. For example, a color scheme determined by the color recognition processor 475 may include a histogram representing the number of pixels in the video image region(s) displaying certain colors of interest.

In an example implementation, a statistical color database is maintained by the central processing facility 140 to track, for example, the different colors and color combinations displayed in web pages. The central processing facility 140 in such an example can then use the statistical color database to determine distinctive colors and/or color combinations of interest that can be used to identify web pages. The example color recognition processor 475 can then be configured accordingly to determine color schemes based on detecting the colors and/or color combination of interest, while ignoring other (e.g., more common and/or non-distinctive) colors and/or color combinations.

In some example implementations, the color scheme(s) determined by the color recognition processor 475 are compared to reference color schemes mapped to known web pages. In this way, the color scheme(s) determined by the color recognition processor 475 can be used to augment the textual information extracted by the example textual recognition processor 430 for identifying the web page(s) displayed by the monitored web browser. Additionally or alternatively, the determined color scheme(s) alone may be used for identifying displayed web pages, such as when the text displayed by an address bar and/or title bar of the monitored web browser is partially or fully obscured by other information (e.g., such as one or more windows corresponding to other executing application(s)) being displayed by the device implementing the monitored web browser(s).

The mappings of reference color schemes to known web pages can be determined in any number of ways. For example, color schemes can be associated with the textual information extracted by the example web browser monitor 470, when the latter is available, to associate color schemes with web pages. Additionally or alternatively, web crawlers or similar applications can be used by, for example, the central processing facility 140 to generate a database of reference color schemes and their respective mappings to known web pages. In either example, the mappings of reference color schemes to known web pages can be updated as the color schemes associated with known web sites change.

While an example manner of implementing the first example web browser monitor 105 of FIG. 1, the second example web browser monitor 205 of FIG. 2 and/or the third example web browser monitor 305 of FIG. 3 has been illustrated in FIG. 4B, one or more of the elements, processes and/or devices illustrated in FIG. 4B may be combined, divided, re-arranged, omitted, eliminated and/or implemented in any other way. Further, the example video interface 405, the example graphical recognition processor 420, the example feature extractor 425, the example textual recognition processor 430, the example OCR processor 435, the example network interface 445, the example video interface activity detector 460, the example color recognition processor 475 and/or, more generally, the example web browser monitor 470 of FIG. 4B may be implemented by hardware, software, firmware and/or any combination of hardware, software and/or firmware. Thus, for example, any of the example video interface 405, the example graphical recognition processor 420, the example feature extractor 425, the example textual recognition processor 430, the example OCR processor 435, the example network interface 445, the example video interface activity detector 460, the example color recognition processor 475 and/or, more generally, the example web browser monitor 470 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example web browser monitor 470, the example video interface 405, the example graphical recognition processor 420, the example feature extractor 425, the example textual recognition processor 430, the example OCR processor 435, the example network interface 445, the example video interface activity detector 460 and/or the example color recognition processor 475 are hereby expressly defined to include a tangible medium such as a memory, digital versatile disk (DVD), compact disk (CD,) etc., storing such software and/or firmware. Further still, the example web browser monitor 470 of FIG. 4B may include one or more elements, processes and/or devices in addition to, or instead of, those illustrated in FIG. 4B, and/or may include more than one of any or all of the illustrated elements, processes and devices.

Flowcharts representative of example machine readable instructions that may be executed to implement the first example system 100, the first example web browser monitor 105, the example central processing facility 140, the second example system 200, the second example web browser monitor 205, the third example system 300, the third example web browser monitor 305, the example web browser monitor 400, the example video interface 405, the example graphical recognition processor 420, the example feature extractor 425, the example textual recognition processor 430, the example OCR processor 435, the example network interface 445, the example video interface activity detector 460, the example web browser monitor 470 and/or the example color recognition processor 475 are shown in FIGS. 5 through 8. In these examples, the machine readable instructions represented by each flowchart may comprise one or more programs for execution by: (a) a processor, such as the processor 912 shown in the example computer 900 discussed below in connection with FIG. 9, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 912, but the entire program or programs and/or portions thereof could alternatively be executed by a device other than the processor 912 and/or embodied in firmware or dedicated hardware (e.g., implemented by an application specific integrated circuit (ASIC), a programmable logic device (PLD), a field programmable logic device (FPLD), discrete logic, etc.). For example, any or all of the first example system 100, the first example web browser monitor 105, the example central processing facility 140, the second example system 200, the second example web browser monitor 205, the third example system 300, the third example web browser monitor 305, the example web browser monitor 400, the example video interface 405, the example graphical recognition processor 420, the example feature extractor 425, the example textual recognition processor 430, the example OCR processor 435, the example network interface 445, the example video interface activity detector 460, the example web browser monitor 470 and/or the example color recognition processor 475 could be implemented by any combination of software, hardware, and/or firmware. Also, some or all of the machine readable instructions represented by the flowchart of FIGS. 5 through 8 may be implemented manually. Further, although the example machine readable instructions are described with reference to the flowcharts illustrated in FIGS. 5 through 8, many other techniques for implementing the example methods and apparatus described herein may alternatively be used. For example, with reference to the flowcharts illustrated in FIGS. 5 through 8, the order of execution of the blocks may be changed, and/or some of the blocks described may be changed, eliminated, combined and/or subdivided into multiple blocks.

Figure 5:
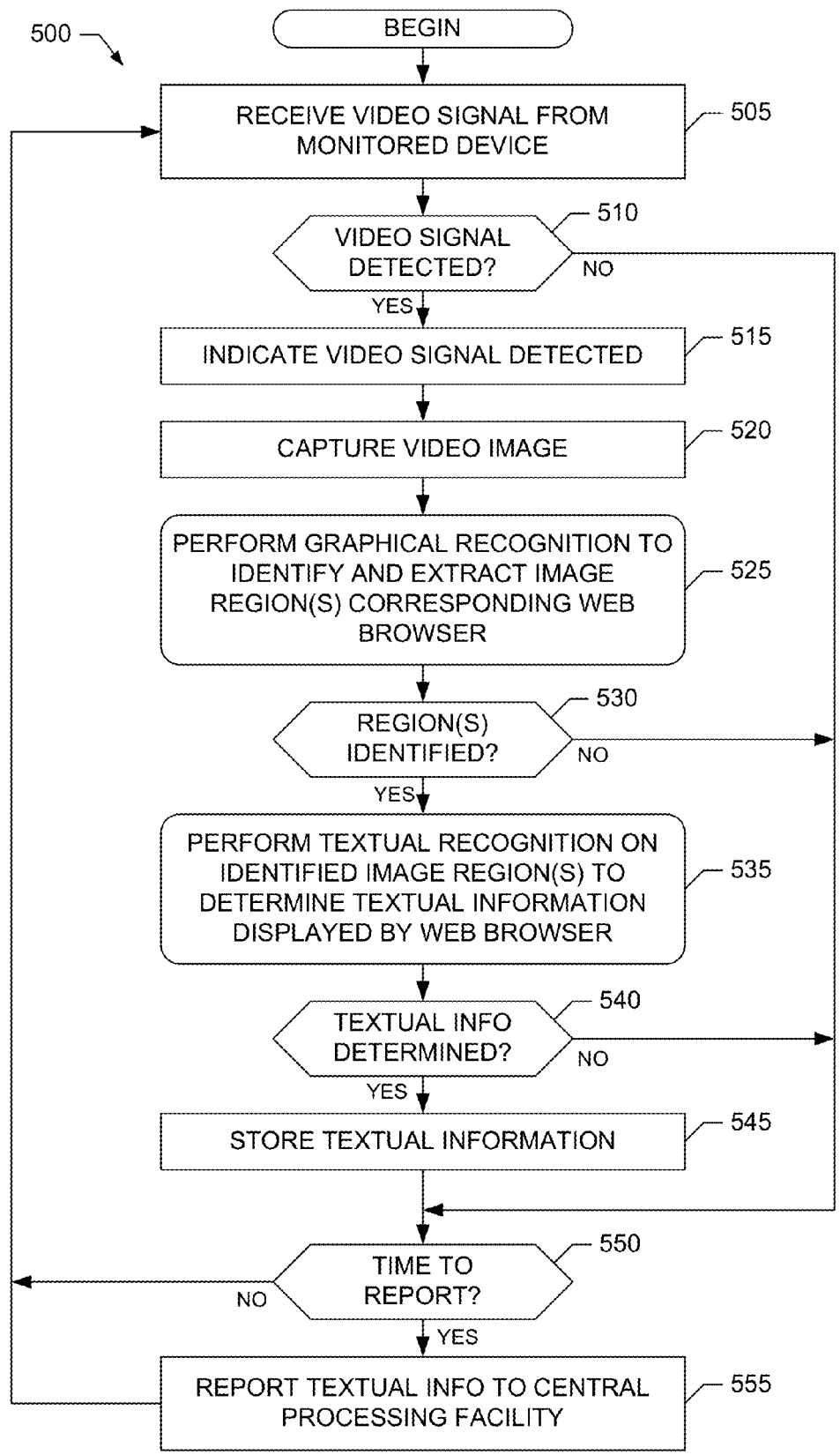
FIG. 5 is a flowchart representative of example machine readable instructions that may be executed to implement the example web browser monitors of FIGS. 4A and/or 4B.

Example machine readable instructions 500 that may be executed to implement the first example web browser monitor 105 of FIG. 1, the second example web browser monitor 205 of FIG. 2, the third example web browser monitor 305 of FIG. 3 and/or the example web browser monitor 400 of FIG. 4A are represented by the flowchart shown in FIG. 5. For convenience, and without loss of generality, the execution of the example machine readable instructions 500 is described in connection with the operation of the first example web browser monitor 105 in the first example system 100 of FIG. 1, unless otherwise noted. The machine readable instructions 500 begin execution at block 505 at which the first example web browser monitor 105 receives a video signal from the computer 115 being monitored. For example, at block 505 the video signal may be received from the first video connection 130 coupled to the video interface 125 of the first example web browser monitor 105. Alternatively, turning to the example of FIG. 3, at block 505 the video signal could be received via a camera implemented by the video interface 325 of the third example web browser monitor 305 and positioned to capture video images corresponding to the monitor 120.

Returning to FIG. 5, control next proceeds to block 510 at which the first example web browser monitor 105 detects whether a valid video signal is received at block 505. For example, and as discussed in greater detail above, at block 510 a video interface activity detector (e.g., such as the video interface activity detector 460) included in the first example web browser monitor 105 may determine whether a voltage and/or flicker associated with the video signal received at block 505 is indicative of a valid video signal. If a valid video signal is not detected (block 510), control advances to block 550. Otherwise, if a valid video signal is detected (block 510), control proceeds to block 515 at which the first example web browser monitor 105 indicates that a valid received video signal has been detected. For example, at block 515 the video interface activity indicator 180 included in the first example web browser monitor 105 may be asserted/activated to indicate that a valid video signal has been received.

Next, control proceeds to block 520 at which the first example web browser monitor 105 captures a video image from the video signal received at block 505. For example, at block 520 the video interface 125 of the first example web browser monitor 105 may capture a video image from the video signal using any appropriate frame capture/grabbing technique. Alternatively, at block 520 the video interface 325 of the third example web browser monitor 305 of FIG. 3 may use its implemented camera to create sequences of images corresponding to a display device (e.g., such as the monitor 120) positioned within the camera's field of view. After obtaining a captured video image at block 520, control proceeds to block 525.

Figure 6:
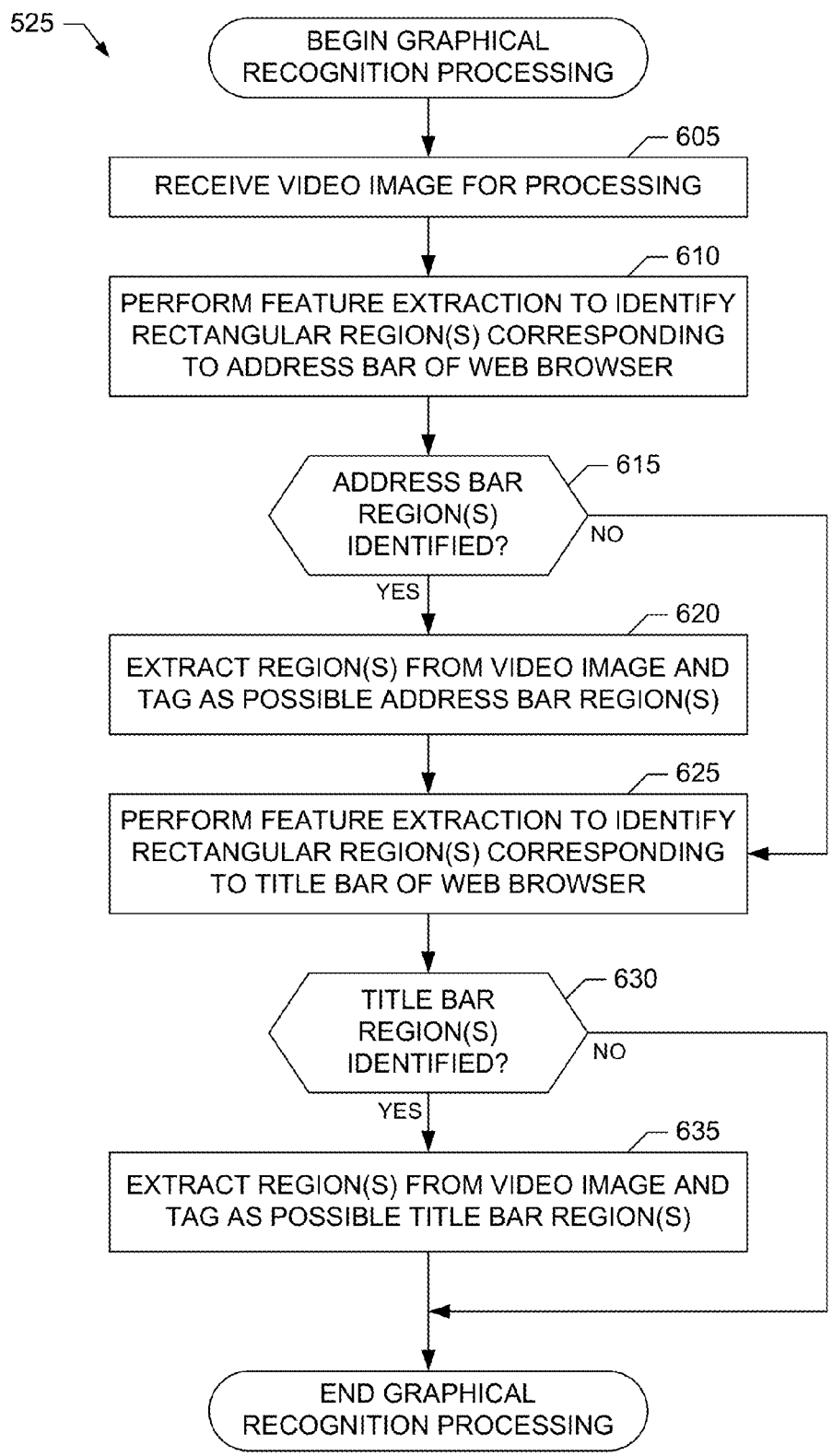
FIG. 6 is a flowchart representative of example machine readable instructions that may be executed to perform graphical recognition processing to implement the example machine readable instructions of FIG. 5 and/or the example graphical recognition processor included in the example web browser monitors of FIGS. 4A and/or 4B.

At block 525 the first example web browser monitor 105 performs graphical recognition processing on the video image captured at block 520 to identify and extract one or more image regions corresponding to a web browser displayed by the monitored device. For example, at block 525 the first example web browser monitor 105 may employ one or more feature extraction techniques to identify one or more rectangular regions corresponding to the address bar 145 and/or title bar 150 of the web browser 110 implemented by the computer 115 and displayed via the monitor 120. Example machine readable instructions that may be executed to implement the processing performed at block 525 are shown in FIG. 6 and discussed in greater below.

Figure 7A:
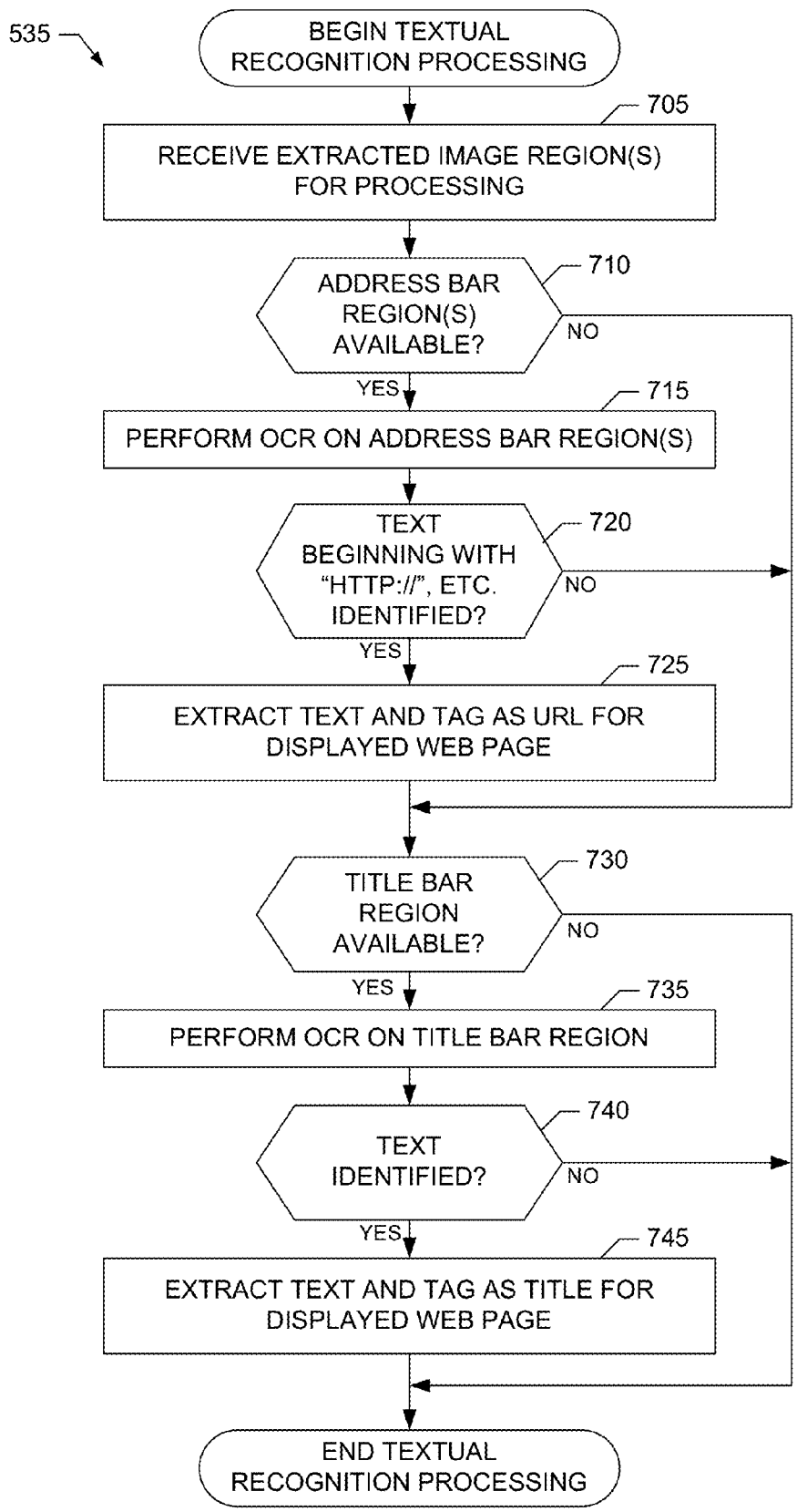
FIG. 7A is a flowchart representative of example machine readable instructions that may be executed to perform textual recognition processing to implement the example machine readable instructions of FIG. 5 and/or the example textual recognition processor included in the example web browser monitors of FIGS. 4A and/or 4B.

Next, control proceeds to block 530 at which the first example web browser monitor 105 determines whether one or more image regions corresponding to a web browser were identified and extracted at block 525 from the video image captured at block 520. If at least one image region was identified (block 530), control proceeds to block 535 at which the first example web browser monitor 105 performs textual recognition processing on the image region(s) identified at block 530 to determine textual information displayed by the web browser undergoing monitoring. In the illustrated example, at block 535 the first example web browser monitor 105 performs any appropriate OCR to determine textual information corresponding to an address (e.g., URL or numeric IP address) displayed in the address bar of the monitored web browser, and/or to a title of a web page presented by the monitored web browser. For example, at block 535 the first example web browser monitor 105 may search for specific strings of text matching a known format for addresses of web pages presented by the monitored web browser. If such matching text strings are found, the first example web browser monitor 105 tags the matching strings (and possibly the corresponding image region) as corresponding to an address of a web page being presented by the monitored web browser. Additional textual information, such as title information, (and the image region(s) corresponding thereto) may also be tagged at block 535. Example machine readable instructions that may be executed to implement the processing performed at block 535 are shown in FIG. 7A and discussed in greater below.

Control next proceeds to block 540 at which the first example web browser monitor 105 determines whether any textual information was determined from the image region(s) processed at block 535. If any textual information was determined (block 540), control proceeds to block 545 at which the first example web browser monitor 105 stores the determined textual information as web browser monitoring data to be reported to a central processing facility (e.g., such as the central processing facility 140). For example, at block 545 the first example web browser monitor 105 stores any identified, extracted and/or tagged address information, title information, etc., determined to be included in the extracted image regions processed at block 535. After storing the web browser monitoring data at block 545, or after failing to detect a valid received video signal (block 510), or after determining that no image regions corresponding to a web browser were identified and extracted from the captured video (block 530), or if no relevant textual information was determined from any processed image region(s) (block 540), control proceeds to block 550.

At block 550, the first example web browser monitor 105 determines whether it is time to report any stored web browser monitoring data to the central processing facility 140. For example, at block 550 the first example web browser monitor 105 may trigger reporting by determining whether a predetermined time interval has expired, whether a particular event has occurred (e.g., such as a prompt from the central processing facility 140 to the web browser monitor 105 to report any available web browser monitoring data), etc. If the first example web browser monitor 105 determines that reporting has been triggered (block 550), control proceeds to block 555 at which the first example web browser monitor 105 reports the stored web browser monitoring data to the appropriate central processing facility 140. For example, at block 555 the first example web browser monitor 105 may report the web browser monitoring data to the central processing facility 140 using a second access network which is the same as or different from a first access network providing network connectivity to the monitored device. After reporting the stored web browser monitoring data at block 555, or if reporting has not yet been triggered (block 550), control returns to block 505 and blocks subsequent thereto at which the first example web browser monitor 105 continues to receive and process the video signal corresponding to the monitored device.

Example machine readable instructions 525 that may be executed to implement the example graphical recognition processor 420 of FIG. 4A and/or to perform the graphical recognition processing at block 525 of FIG. 5 are represented by the flowchart shown in FIG. 6. The machine readable instructions 525 begin execution at block of 605 at which the example graphical recognition processor 420 receives a captured video image from a video signal corresponding to a monitored device (e.g., such as the computer 115) implementing a monitored web browser (e.g., such as the web browser 110). The captured video image may be received from, for example, the example video interface 405 or via the processing at block 520 of FIG. 5.

Control next proceeds to block 610 at which the example graphical recognition processor 420 performs feature extraction on the captured video image to identify one or more rectangular regions that could correspond to an address bar (e.g., such as the address bar 145) of the monitored web browser (e.g., such as the web browser 110). For example, at block 610 the example feature extractor 425 implemented by the example graphical recognition processor 420 may perform edge detection, corner detection, blob detection, etc., or any combination thereof, on the captured video image to identify rectangular region(s) consistent with an address bar of a web browser. In an example implementation, at block 610 the example feature extractor 425 operates to identify rectangular region(s) of the captured image having some or all of the following characteristics consistent with an address bar of a web browser: (1) a substantially light solid background having a high aspect ratio (i.e., large width relative to a small height), (2) being located directly below a rectangular region having a dark solid background color (e.g., such as the title bar of the web browser), (3) being located above a second large rectangular region (e.g., such as the main body of the web browser), etc.

Control next proceeds to block 615 at which the example graphical recognition processor 420 determines whether any rectangular regions were identified at block 610 as possibly corresponding to the address bar (e.g., such as the address bar 145) of the monitored web browser (e.g., such as the web browser 110). If any such regions were identified (block 615), control proceeds to block 620 at which the example graphical recognition processor 420 extracts the region(s) identified at block 610 from the captured video image and tags the region(s) as possible address bar region(s). After extracting and tagging the region(s) at block 620, or if no possible address bar regions were identified (block 615), control proceeds to block 625.

At block 625, the example graphical recognition processor 420 performs feature extraction on the captured video image to identify one or more rectangular regions that could correspond to a title bar (e.g., such as the title bar 150) of the monitored web browser (e.g., such as the web browser 110). For example, at block 625 the example feature extractor 425 implemented by the example graphical recognition processor 420 may perform edge detection, corner detection, blob detection, etc., or any combination thereof, on the captured video image to identify rectangular region(s) consistent with a title bar of a web browser. In an example implementation, at block 625 the example feature extractor 425 operates to identify rectangular region(s) of the captured image having some or all of the following characteristics consistent with a title bar of a web browser: (1) a substantially dark solid background having a high aspect ratio (i.e., large width relative to a small height), (2) being located above a second large rectangular region (e.g., such as the main body of the web browser), etc.

Control next proceeds to block 630 at which the example graphical recognition processor 420 determines whether any rectangular regions were identified at block 625 as possibly corresponding to the title bar (e.g., such as the title bar 150) of the monitored web browser (e.g., such as the web browser 110). If any such regions were identified (block 630), control proceeds to block 635 at which the example graphical recognition processor 420 extracts the region(s) identified at block 625 from the captured video image and tags the region(s) as possible title bar region(s). After extracting and tagging the region(s) at block 635, or if no possible title bar regions were identified (block 630), execution of the example machine readable instructions 525 ends.

Example machine readable instructions 535 that may be executed to implement the example textual recognition processor 430 of FIG. 4A and/or to perform the textual recognition processing at block 535 of FIG. 5 are represented by the flowchart shown in FIG. 7A. The machine readable instructions 535 begin execution at block of 705 at which the example textual recognition processor 430 receives one or more extracted image regions identified as possibly corresponding to a monitored web browser (e.g., such as the web browser 110). The extracted image region(s) may be received from, for example, the example graphical recognition processor 420 or via the processing at block 525 of FIG. 5.

Control next proceeds to block 710 at which the example textual recognition processor 430 determines whether any of the one or more received image regions are tagged as possible address bar region(s). If a possible address bar region is available (block 710), control proceeds to block 715 at which the example textual recognition processor 430 performs OCR processing on the possible address bar region(s). For example, at block 715 the example OCR processor 435 implemented by the example textual recognition processor 430 performs any appropriate OCR technique for determining textual information included in possible address bar region(s). After identifying any text included in the possible address bar region(s), control proceeds to block 720.

At block 720, the example textual recognition processor 430 determines whether any text identified at block 715 matches one or more known formats of a URL or a numeric IP address corresponding to an address (e.g., such as the address 155) of a web page presented by the monitored web browser (e.g., such as the web browser 110). In the illustrated example, at block 720 the example textual recognition processor 430 determines whether any of the text identified at block 715 matches any of the strings "http://", "https://", "ftp://", "news://", etc., which are known to represent the beginning of a web page URL. Additionally (e.g., to improve detection reliability) or alternatively, at block 720 the example textual recognition processor 430 could determine whether any of the text identified at block 715 matches the string "www." or any sequence of three or four strings of text separated by periods, which are indicative of the formats of URLs or numeric IP addresses. If matching text is found (block 720), control proceeds to block 725 at which the example textual recognition processor 430 extracts and tags the matching text as corresponding to the address (e.g., such as the address 155) displayed in the address bar (e.g., such as the address bar 145) of the monitored web browser (e.g., such as the web browser 110).

After extracting and tagging the address textual information at block 725, or if no text matches the known address format(s) (block 720), or if no possible address region(s) were received for processing (block 710), control proceeds to block 730. At block 730, the example textual recognition processor 430 determines whether any of the one or more received image regions are tagged as possible title bar region(s). If a possible title bar region is available (block 730), control proceeds to block 735 at which the example textual recognition processor 430 performs OCR processing on the possible title bar region(s). For example, at block 735 the example OCR processor 435 implemented by the example textual recognition processor 430 performs any appropriate OCR technique for determining textual information included in possible title bar region(s). After identifying any text included in the possible title bar region(s), control proceeds to block 740.

At block 740, the example textual recognition processor 430 determines whether any text was identified at block 735. If any text was identified (block 740), control proceeds to block 745 at which the example textual recognition processor 430 extracts and tags the identified text as corresponding to the title (e.g., such as the title 160) displayed in the title bar (e.g., such as the title bar 150) of the monitored web browser (e.g., such as the web browser 110). After extracting and tagging the textual information (which may be title information) at block 745, or if no text was identified in a possible title bar region (block 740), execution of the example machine readable instructions 535 ends.

Figure 7B:
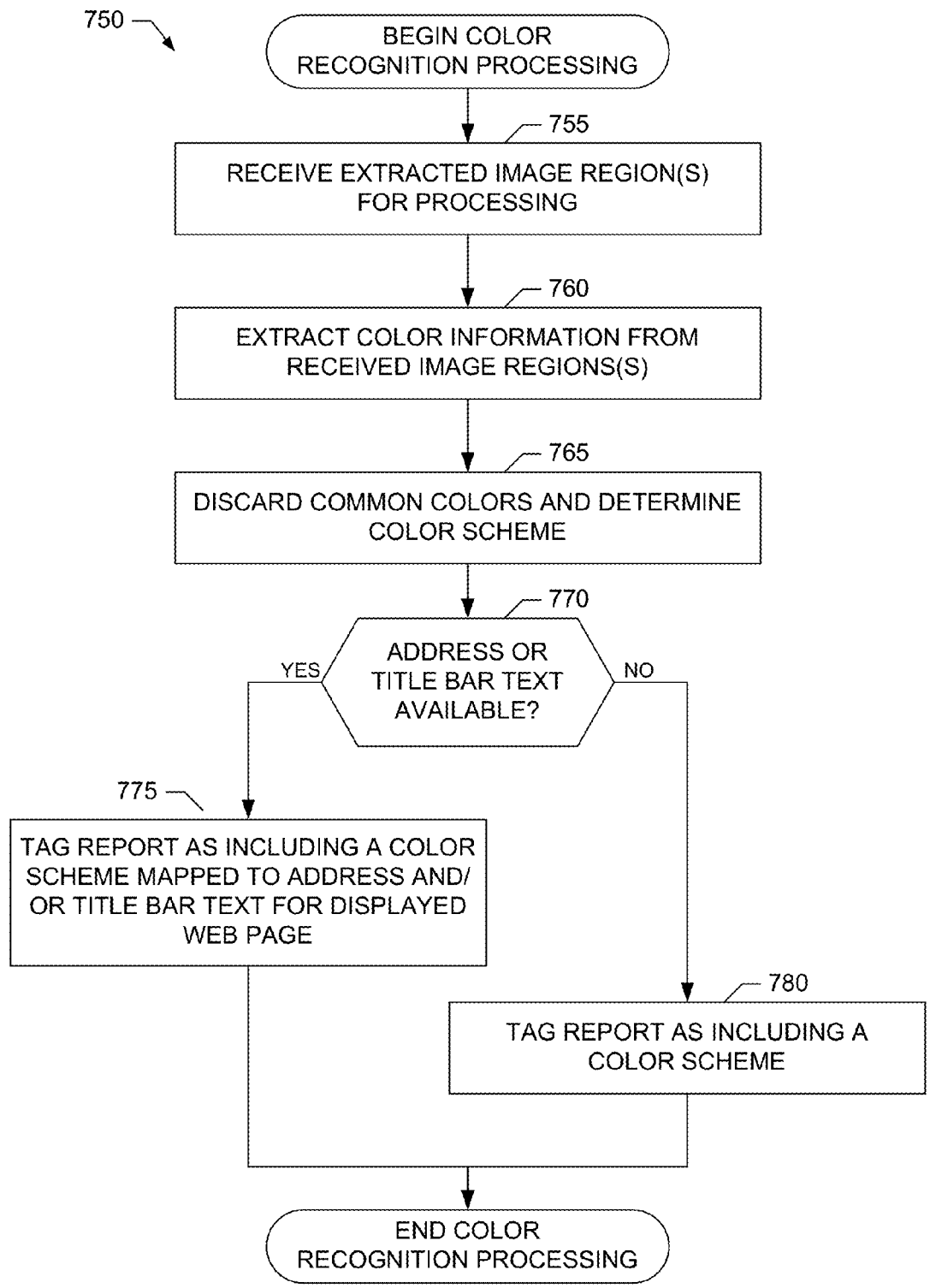
FIG. 7B is a flowchart representative of example machine readable instructions that may be executed to perform color recognition processing to implement the example machine readable instructions of FIG. 5 and/or the example color recognition processor included in the example web browser monitor of FIG. 4B.

Example machine readable instructions 750 that may be executed to implement the example color recognition processor 475 of FIG. 4B are represented by the flowchart shown in FIG. 7B. The example machine readable instructions 750 of FIG. 7B may also be executed in addition to or instead of the textual recognition processing performed at block 535 of FIG. 5. The machine readable instructions 750 begin execution at block of 755 at which the example color recognition processor 475 receives one or more extracted image regions identified as possibly corresponding to a monitored web browser (e.g., such as the web browser 110). The extracted image region(s) may be received from, for example, the example graphical recognition processor 420 or via the processing at block 525 of FIG. 5.

Control next proceeds to block 760 at which the example color recognition processor 475 extracts color information from the extracted image region(s) received at block 755. For example, at block 760 the example color recognition processor 475 may extract red, green and/or blue values from all or some subsampled set of the pixels included in the extracted image region(s). Next, control proceeds to block 765 at which the example color recognition processor 475 discards the color information extracted at block 760 that corresponds to common (e.g., non-distinctive) colors. For example, and as discussed above in connection with FIG. 4B, the central processing facility 140 may maintain a statistical color database to track colors and color combinations displayed in web pages. The central processing facility 140 may then use this statistical information to determine distinctive colors and/or color combinations of interest that can be used to identify web pages. In such an example, at block 765 the example color recognition processor 475 discards the colors that are not of interest (e.g., that are common/non-distinctive) and then determines a color scheme for the image region(s) based on the remaining color information. As discussed above, the color scheme determined at block 765 may include a histogram representing a distribution of a number of pixels in the image region(s) displaying certain colors of interest.

Next, control proceeds to block 770 at which the example color recognition processor 475 determines whether textual information associated with the monitored web page's address and/or title bar is available. If such textual information is available, control proceeds to block 775 at which the example color recognition processor 475 tags the color scheme determined at block 765 to indicate that the determined color scheme is mapped to the available address and/or title text (and, thus, the corresponding web page). Execution of the example machine readable instructions 775 then ends. However, if address and/or title bar textual information is not available (block 770), control proceeds to block 780. At block 780, the example color recognition processor 475 tags the color scheme determined at block 765 to indicate that the determined color scheme is not mapped to any textual information and, thus, is to be used, for example, as the sole identifier of the web page displayed by the monitored web browser. Execution of the example machine readable instructions then ends.

Figure 8:
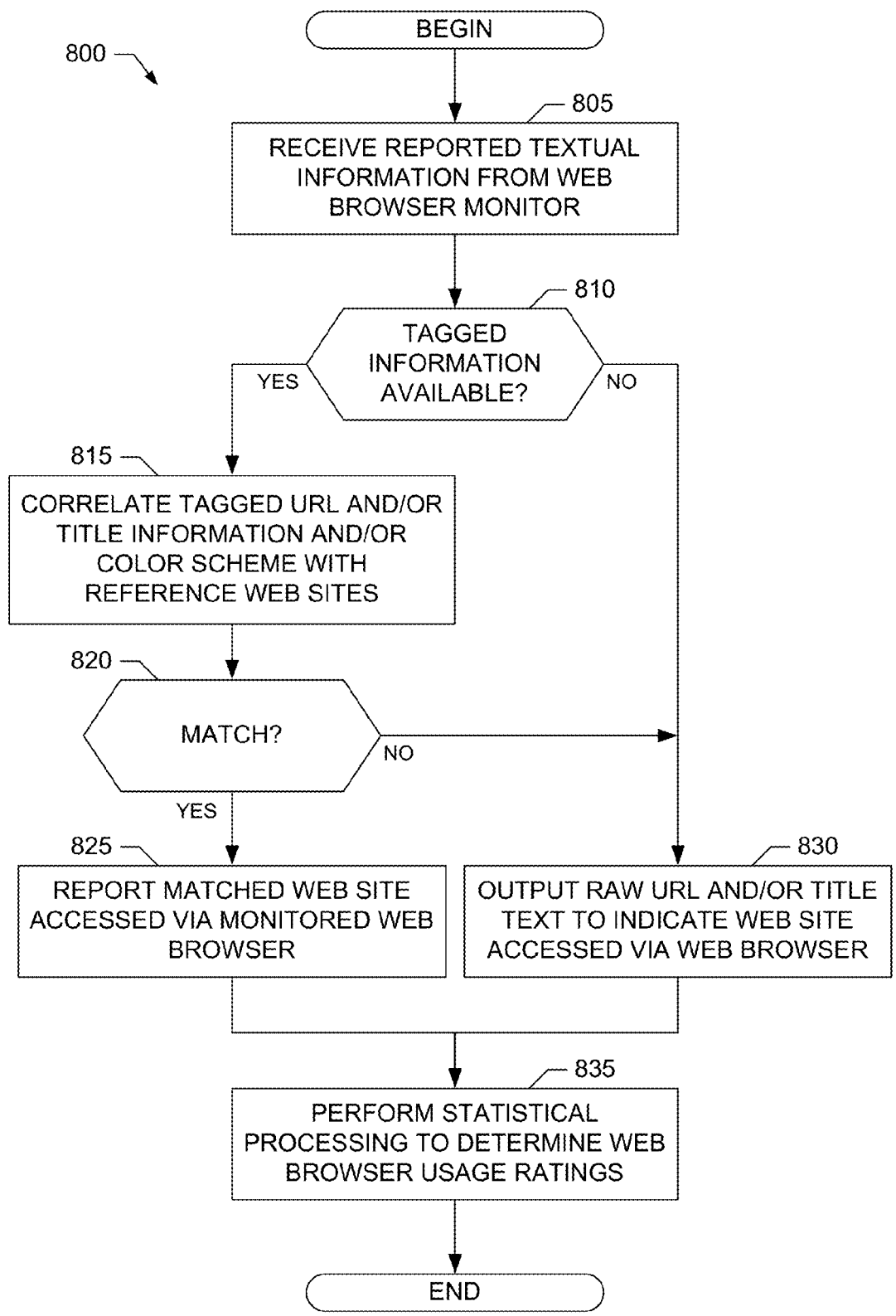
FIG. 8 is a flowchart representative of example machine readable instructions that may be executed to implement an example central processing facility for use in the example systems of FIGS. 1, 2 and/or 3.

Example machine readable instructions 800 that may be executed to implement the central processing facility 140 of FIGS. 1, 2 and/or 3 are represented by the flowchart shown in FIG. 8. For convenience, and without loss of generality, the execution of the example machine readable instructions 800 is described in connection with the operation of the example central processing facility 140 in the first example system 100 of FIG. 1, unless otherwise noted. The machine readable instructions 800 begin execution at block of 805 at which the example central processing facility 140 receives reported web browser monitoring data from a web browser monitor (e.g., such as the example web browser monitor 105). For example, at block 805 the example central processing facility 140 may receive address and/or title textual information corresponding to address(es) (e.g., such as the address 155) and/or title(s) (e.g., such as the title 160) displayed by a monitored web browser (e.g., such as the web browser 110). Additionally or alternatively, at block 805 the example central processing facility 140 may receive determined color scheme(s) corresponding to web page(s) displayed by the monitored web browser (e.g., such as the web browser 110).

Next, control proceeds to block 810 at which the example central processing facility 140 determines whether any of the received web browser monitoring data is tagged to indicate the type of monitoring data being reported. For example, tags may be included with the reported data to indicate whether the reported data includes address textual information, title textual information, determined color schemes, etc. If the reported data is tagged (block 810), control proceeds to block 815. At block 815, the example central processing facility 140 correlates any tagged address textual information with known addresses (e.g., URLs and/or numeric IP addresses) corresponding to reference web sites (and/or web page(s)) being tracked by the example central processing facility 140. Additionally, at block 815, the example central processing facility 140 correlates any tagged title textual information with known titles corresponding to reference web sites (and/or web page(s)) being tracked by the example central processing facility 140. Furthermore, at block 815, the example central processing facility 140 correlates any tagged color scheme information with known color schemes corresponding to reference web sites (and/or web page(s)) being tracked by the example central processing facility 140.

After performing the correlation(s) at block 815, control proceeds to block 820 at which the example central processing facility 140 determines whether any of the reported data matched one or more reference web site(s) (and/or web page(s)). If a match was found (block 820), control proceeds to block 825 at which the example central processing facility 140 reports that the matched reference web site(s) (and/or web page(s)) was/(were) accessed via the monitored web browser (e.g., such as the web browser 110) corresponding to the reported data received at block 805. However, if no match was found (block 820) or the reported data received at block 805 included no tagged information (block 810), control proceeds to block 830 at which the example central processing facility 140 outputs the raw reported data, which may include address information (e.g., URL(s) and/or numeric IP address(es)) title information, and/or color scheme information to indicate the web site(s) (and/or web page(s)) accessed via the monitored web browser (e.g., such as the web browser 110) corresponding to the reported data received at block 805. Next, at block 835 the central processing facility 140 performs any appropriate statistical processing to determine web browser usage ratings from the reported web browser monitoring data. After processing at block 835 completes, execution of the example machine readable instructions 800 ends.

Figure 9:
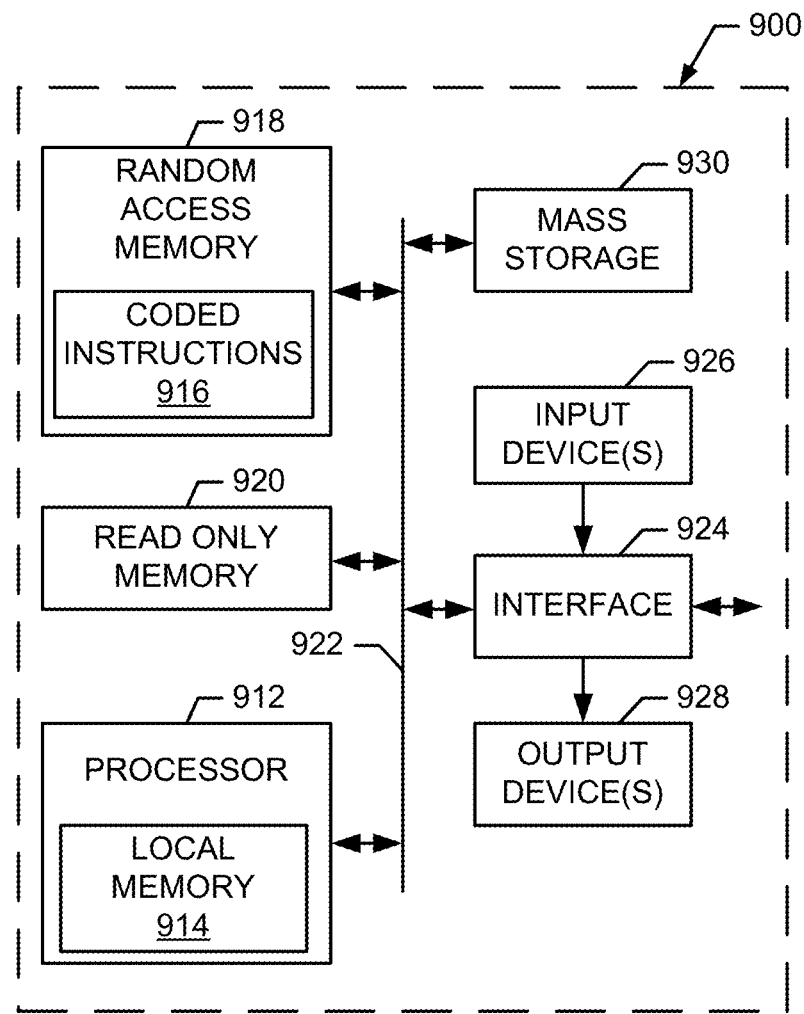
FIG. 9 is a block diagram of an example computer that may execute the example machine readable instructions of FIGS. 5, 6, 7A, 7B and/or 8 to implement the example web browser monitors of FIG. 4A and/or 4B, and/or the example systems of FIGS. 1, 2 and/or 3.

FIG. 9 is a block diagram of an example computer 900 capable of implementing the apparatus and methods disclosed herein. The computer 900 can be, for example, a server, a personal computer, a personal digital assistant (PDA), an Internet appliance, a DVD player, a CD player, a digital video recorder, a personal video recorder, a set top box, or any other type of computing device.

The system 900 of the instant example includes a processor 912 such as a general purpose programmable processor. The processor 912 includes a local memory 914, and executes coded instructions 916 present in the local memory 914 and/or in another memory device. The processor 912 may execute, among other things, the machine readable instructions represented in FIGS. 5-8. The processor 912 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown).

The computer 900 also includes an interface circuit 924. The interface circuit 924 may be implemented by any type of interface standard, such as an Ethernet interface, a universal serial bus (USB), and/or a third generation input/output (3GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a cathode ray tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 900 also includes one or more mass storage devices 930 for storing software and data. Examples of such mass storage devices 930 include floppy disk drives, hard drive disks, compact disk drives and digital versatile disk (DVD) drives. The mass storage device 930 may implement the example storage unit 440. Alternatively, the volatile memory 918 may implement the example storage unit 440.

As an alternative to implementing the methods and/or apparatus described herein in a system such as the device of FIG. 9, the methods and or apparatus described herein may be embedded in a structure such as a processor and/or an ASIC (application specific integrated circuit).

From the foregoing disclosure, at least some of the example methods and apparatus described herein perform nonintrusive web browser monitoring without requiring any access to the software platform or internal hardware of the computing device (e.g., computer) implementing the monitored web browser. In these examples, an external web browser monitor determines web browser usage from captured video images corresponding to a web browser displayed by the computing device. Given the prevalence of software applications capable of being downloaded to and executed on computing devices to perform all sorts of monitoring, the use of such an external web browser monitor for monitoring web browser usage can seem counterintuitive and unexpected. Yet, in at least some example implementations, the external web browser monitor described herein yields benefits over one or more conventional software monitoring applications executing on the computing device.

For example, an external web browser monitor can be especially beneficial when conventional software monitoring applications are banned by an enterprise due to, for example, concerns regarding increased risks of viruses and/or software program incompatibilities. Such software program incompatibilities can arise from, for example, installation and/or execution of the conventional software monitoring application(s) conflicting with one or more firewalls, virus protection applications, operating systems, etc., already installed and/or executing on the computing device. In contrast, at least some of the example external web browser monitor implementations described herein operate autonomously from the monitored computing device and, thus, are compatible with almost any type of computing device regardless of manufacturer, operating system, etc. Moreover, at least some example web browser monitor implementations described herein overcome the deficiencies of existing nonintrusive techniques which, as described above, are tailored to monitoring television broadcasts and other media content presentations, but are unsuitable for monitoring web browser usage nonintrusively.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:
1. A method for monitoring web browsing, the method comprising:
 processing, by executing an instruction with a processor, a video image obtained from a video signal of a device implementing a web browser to identify a first image region less than the entire video image, the first image region having a first shape corresponding to an address bar of the web browser;

tagging, by executing an instruction with the processor, first textual information identified in the first image region as corresponding to an address of a web page displayed by the web browser in response to determining that the first textual information includes a first string of text matching a reference string of text; and reporting the tagged first textual information to determine usage of the web browser.

2. The method as defined in claim 1, further including:

identifying a second image region of the video image having a second shape corresponding to a title bar of the web browser;

tagging second textual information identified in the second image region as corresponding to a title of the web page displayed by the web browser in response to determining that the second image region has a first position relative to the first image region; and reporting the tagged first textual information and the tagged second textual information to determine usage of the web browser.

3. The method as defined in claim 2, wherein tagging the second textual information includes tagging the second textual information identified in the second image region as corresponding to the title of the web page displayed by the web browser in response to determining that the second image region is positioned above the first image region.

4. The method as defined in claim 2, further including:

tagging the first image region as corresponding to the address bar of the web browser; and tagging the second image region as corresponding to the title bar of the web browser.

5. The method as defined in claim 1, wherein the reference string of text corresponds to at least one of: (1) a uniform resource locator (URL) scheme, (2) a start of a URL, (3) a domain suffix, (4) a sequence of at least two strings of text separated by one or more periods, or (5) a numeric internet protocol (IP) address format.

6. A tangible computer readable storage device or storage disk comprising computer readable instructions which, when executed, cause a computing device to at least:

process a video image obtained from a video signal of a device implementing a web browser to identify a first image region less than the entire video image, the first image region having a first shape corresponding to an address bar of the web browser;

tag first textual information identified in the first image region as corresponding to an address of a web page displayed by the web browser in response to determining that the first textual information includes a first string of text matching a reference string of text; and report the tagged first textual information to determine usage of the web browser.

7. The storage device or storage disk as defined in claim 6, wherein the instructions, when executed, further cause the computing device to:

identify a second image region of the video image having a second shape corresponding to a title bar of the web browser;

tag second textual information identified in the second image region as corresponding to a title of the web page displayed by the web browser in response to determining that the second image region has a first position relative to the first image region; and report the tagged first textual information and the tagged second textual information to determine usage of the web browser.

8. The storage device or storage disk as defined in claim 7, wherein the instructions, when executed, further cause the computing device to tag the second textual information identified in the second image region as corresponding to the title of the web page displayed by the web browser in response to determining that the second image region is positioned above the first image region.

9. The storage device or storage disk as defined in claim 7, wherein the instructions, when executed, further cause the computing device to:

tag the first image region as corresponding to the address bar of the web browser; and tag the second image region as corresponding to the title bar of the web browser.

10. The storage device or storage disk as defined in claim 6, wherein the reference string of text corresponds to at least one of: (1) a uniform resource locator (URL) scheme, (2) a start of a URL, (3) a domain suffix, (4) a sequence of at least two strings of text separated by one or more periods, or (5) a numeric internet protocol (IP) address format.

11. An apparatus for monitoring web browsing, the apparatus comprising:

a computer processor;

a graphical recognition processor to process a video image obtained from a video signal of a device implementing a web browser to identify a first image region less than the entire video image, the first image region having a first shape corresponding to an address bar of the web browser;

a textual recognition processor to tag first textual information identified in the first image region as corresponding to an address of a web page displayed by the web browser in response to determining that the first textual information includes a first string of text matching a reference string of text; and a network interface report the tagged first textual information to determine usage of the web browser, at least one of the graphical recognition processor, the textual recognition processor or the network interface being implemented by the computer processor.

12. The apparatus as defined in claim 11, wherein:

the graphical recognition processor is further to identify a second image region of the video image having a second shape corresponding to a title bar of the web browser;

the textual recognition processor is further to tag second textual information identified in the second image region as corresponding to a title of the web page displayed by the web browser in response to determining that the second image region has a first position relative to the first image region; and the network interface is further to report the tagged first textual information and the tagged second textual information to determine usage of the web browser.

13. The apparatus as defined in claim 12, wherein the textual recognition processor is further to tag the second textual information identified in the second image region as corresponding to the title of the web page displayed by the web browser in response to determining that the second image region is positioned above the first image region.

14. The apparatus as defined in claim 12, wherein the textual recognition processor is further to:

tag the first image region as corresponding to the address bar of the web browser; and tag the second image region as corresponding to the title bar of the web browser.

15. The apparatus as defined in claim 11, wherein the reference string of text corresponds to at least one of: (1) a uniform resource locator (URL) scheme, (2) a start of a URL, (3) a domain suffix, (4) a sequence of at least two strings of text separated by one or more periods, or (5) a numeric internet protocol (IP) address format.

16. A method to monitor web browsing, the method comprising:
   determining, by executing an instruction with a processor, color scheme information for a region of a captured image including at least a portion of a web page displayed by a web browser implemented by a monitored device, the color scheme information including a histogram representative of respective numbers of pixels in the region having respective colors from a set of colors of interest; and
   comparing, by executing an instruction with the processor, the color scheme information to reference color schemes associated with respective reference web pages to identify, based on the color scheme information, a web site accessed using the web browser.

17. A tangible computer readable storage device or storage disk comprising computer readable instructions which, when executed, cause a computing device to at least:
   determine color scheme information for a region of a captured image including at least a portion of a web page displayed by a web browser implemented by a monitored device, the color scheme information including a histogram representative of respective numbers of pixels in the region having respective colors from a set of colors of interest; and
   compare the color scheme information to reference color schemes associated with respective reference web pages to identify, based on the color scheme information, a web site accessed using the web browser.

18. An apparatus to monitor web browsing, the apparatus comprising:
   means for determining color scheme information for a region of a captured image including at least a portion of a web page displayed by a web browser implemented by a monitored device, the color scheme information including a histogram representative of respective numbers of pixels in the region having respective colors from a set of colors of interest; and
   means for comparing the color scheme information to reference color schemes associated with respective reference web pages to identify, based on the color scheme information, a web site accessed using the web browser.

* * * * *